(12) United States Patent
Balasubramanian et al.

(10) Patent No.: US 10,521,235 B1
(45) Date of Patent: Dec. 31, 2019

(54) DETERMINING PROBLEM DEPENDENCIES IN APPLICATION DEPENDENCY DISCOVERY, REPORTING, AND MANAGEMENT TOOL

(71) Applicant: Capital One Services, LLC, McLean, VA (US)

(72) Inventors: Muralidharan Balasubramanian, Gaithersburg, MD (US); Eric K. Barnum, Midlothian, VA (US); Julie Dallen, Vienna, VA (US); David Watson, Arlington, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/454,551

(22) Filed: Jun. 27, 2019

(51) Int. Cl.
| | | |
|---|---|---|
| *G06F 9/445* | (2018.01) | |
| *G06F 9/38* | (2018.01) | |
| *G06F 9/54* | (2006.01) | |
| *G06N 20/00* | (2019.01) | |
| *G06F 9/50* | (2006.01) | |
| *G06F 16/903* | (2019.01) | |
| *G06F 16/901* | (2019.01) | |

(52) U.S. Cl.
CPC .......... *G06F 9/3838* (2013.01); *G06F 9/5005* (2013.01); *G06F 9/541* (2013.01); *G06F 16/903* (2019.01); *G06F 16/9027* (2019.01); *G06N 20/00* (2019.01)

(58) Field of Classification Search
CPC .................................................... G06F 9/445
See application file for complete search history.

(56) References Cited

U.S. PATENT DOCUMENTS 6,138,122 A * 10/2000 Smith ................. G06F 11/3447
9,240,016 B2    1/2016 Cronin et al.
(Continued)

OTHER PUBLICATIONS

Siem, AIOps, Application Management, Log Management, Machine Learning, and Compliance | Splunk, https://www.splunk.com/, downloaded Jun. 26, 2019, 5 pages.
Elk Stack: Elasticsearch, Logstash, Kibana | Elastic, https://www.elastic.co/elk-stack, downloaded Jun. 26, 2019, 4 pages.
Chaos engineering—Wikipedia, https://en.wikipedia.org/wiki/Chaos_engineering, downloaded Jun. 26, 2019, 7 pages.
(Continued)

*Primary Examiner* — Jae U Jeon
(74) *Attorney, Agent, or Firm* — Banner & Witcoff, Ltd.

(57) ABSTRACT

Techniques for monitoring operating statuses of an application and its dependencies are provided. A monitoring application may collect and report the operating status of the monitored application and each dependency. Through use of existing monitoring interfaces, the monitoring application can collect operating status without requiring modification of the underlying monitored application or dependencies. The monitoring application may determine a problem service that is a root cause of an unhealthy state of the monitored application. Dependency analyzer and discovery crawler techniques may automatically configure and update the monitoring application. Machine learning techniques may be used to determine patterns of performance based on system state information associated with performance events and provide health reports relative to a baseline status of the monitored application. Also provided are techniques for testing a response of the monitored application through modifications to API calls. Such tests may be used to train the machine learning model.

19 Claims, 21 Drawing Sheets

(56) References Cited

U.S. PATENT DOCUMENTS

| | | | |
|---|---|---|---|
| 9,253,054 B2 | 2/2016 | Maturana et al. | |
| 9,286,179 B1* | 3/2016 | Shalla | G06F 11/3664 |
| 10,326,672 B2 | 6/2019 | Scheib et al. | |
| 10,354,201 B1 | 7/2019 | Roy et al. | |
| 2004/0049565 A1* | 3/2004 | Keller | G06F 11/0709 |
| | | | 709/223 |
| 2007/0294364 A1 | 12/2007 | Mohindra et al. | |
| 2013/0304677 A1 | 11/2013 | Gupta et al. | |
| 2016/0359680 A1 | 12/2016 | Parandehgheibi et al. | |
| 2017/0289307 A1 | 10/2017 | Thompson et al. | |
| 2018/0285767 A1 | 10/2018 | Chew | |
| 2019/0005022 A1 | 1/2019 | Deshpande et al. | |
| 2019/0007290 A1 | 1/2019 | He et al. | |
| 2019/0114551 A1 | 4/2019 | Chereshnev | |

OTHER PUBLICATIONS

Netflix attacks own network with "Chaos Monkey"—and now you can too | Ars Technica, https://arstechnica.com/information-technology/2012/07/netflix-attacks-own-network-with-chaos-monkey-and-now-you-can-too/, downloaded Jun. 26, 2019, 5 pages.

ChAP: Chaos Automation Platform—Netflix TechBlog—Medium, https://medium.com/netflix-techblog/chap-chaos-automation-platform-53e6d528371f, downloaded Jun. 26, 2019, 6 pages.

Malin et al., Continuous monitoring and cyber security for high performance computing, 6 pages (Year: 2013).

Klein et al., Runtime Performance Challenges in Big Data Systems, 6 pages (Year:2015).

Deeplog: Anomaly Detection and Diagnosis from System Logs through Deep Learning, 14 pages (Year:2017).

* cited by examiner

DETERMINING PROBLEM DEPENDENCIES IN APPLICATION DEPENDENCY DISCOVERY, REPORTING, AND MANAGEMENT TOOL

CROSS REFERENCE TO RELATED APPLICATIONS

This application is related to the following U.S. Patent Applications, filed on the same day:

U.S. patent application Ser. No. 16/454,562, titled "INTELLIGENT SERVICES FOR APPLICATION DEPENDENCY DISCOVERY, REPORTING, AND MANAGEMENT TOOL" and filed on Jun. 27, 2019;

U.S. patent application Ser. No. 16/454,569, titled "BASELINE MODELING FOR APPLICATION DEPENDENCY DISCOVERY, REPORTING, AND MANAGEMENT TOOL" and filed on Jun. 27, 2019;

U.S. patent application Ser. No. 16/454,579, titled "DEPENDENCY ANALYZER IN APPLICATION DEPENDENCY DISCOVERY, REPORTING, AND MANAGEMENT TOOL" and filed on Jun. 27, 2019;

U.S. patent application Ser. No. 16/454,595, titled "DISCOVERY CRAWLER FOR APPLICATION DEPENDENCY DISCOVERY, REPORTING, AND MANAGEMENT TOOL" and filed on Jun. 27, 2019;

U.S. patent application Ser. No. 16/454,601, titled "TESTING AGENT FOR APPLICATION DEPENDENCY DISCOVERY, REPORTING, AND MANAGEMENT TOOL" and filed on Jun. 27, 2019; and U.S. patent application Ser. No. 16/454,611, titled "INTELLIGENT SERVICES AND TRAINING AGENT FOR APPLICATION DEPENDENCY DISCOVERY, REPORTING, AND MANAGEMENT TOOL" and filed on Jun. 27, 2019.

The entirety of each of the related applications is incorporated by reference herein for all purposes.

FIELD OF USE

Aspects of the disclosure relate generally to monitoring system status in computer systems. More specifically, aspects of the disclosure may provide for enhanced monitoring of application health and facilitate identifying dependencies causing reduced system performance or another unhealthy system status.

BACKGROUND

Computer systems and applications have become an increasingly complex web of interdependencies, as numerous complex systems are internetworked in support of modern commerce. A single account access request by a user may result in hundreds of calls to Application Programming Interfaces (APIs) and other services relied on by a front-end or other application. Applications may be structured to rely on multiple other dependencies to provide and modify data hosted and/or controlled by other systems. These dependencies may be used to provide information to hundreds of thousands of requests every hour, for example. Performance problems at these dependencies may result in the application entering an unhealthy state, for example leading to the application being unable to retrieve necessary data or timing out on user requests. In a high-traffic system, this quickly means that a large number of requests, transactions, and other actions are disrupted.

Service impacts due to performance problems in complex systems can be very damaging. The duration, number of impacted users, and extent of impact to service can increase the profile of a system outage or other unhealthy event. Some companies are subject to reporting regulations as service impacting events meet certain severity criteria. Thus, it can be critical to quickly diagnose and address a root cause of a performance problem in a complex application dependency setting.

Most troubleshooting processes rely on human administrators making use of multiple systems/monitors/alerts and then tracing break events back to a source, trying to find the first one thing that broke. The ability to correlate or delve into the dependencies that are affecting the system in question is a challenge in existing solutions. If any given set (one or many) of those dependencies fails, both that set and the actual system may suffer an error. System administrators work to differentiate the root cause, the first break, the impact chain of cascades, and how to address the break event. Users would need to use multiple different systems for each purpose and then aggregate issues and reports together mentally/visually using whatever tools they have.

System philosophies such as "you build it, you own it" may provide clear points of contact for troubleshooting. But owners responsible for a system that is healthy but for downstream dependencies would need to reach out to other administrators responsible for each dependency, triggering a cascade of calls each taking potentially tens of minutes. This requires slow and careful effort by the system administrators, which can mean that problems persist for extended times as root causes are determined and corrective action is taken.

Monitoring tools such as dashboards may allow system administrators to view various metrics related to system operation. Experienced sysadmins may be able to leverage these dashboards to identify likely causes of system instability. Monitoring interfaces, provided by monitoring interface applications such as Splunk and Elastic (ELK) may facilitate the creation of dashboards by creating interfaces to surface various operating statistics for an application and allow inspection of application attributes. However, these monitoring interfaces still require the experience of a system administrator to select the proper attributes to monitor, and to read the tea leaves during an unhealthy state to determine a root cause. And the monitoring interfaces associated with an application may only provide information about the state of the application itself, and not surface particular issues in application dependencies. In existing solutions, system administrators responsible for an application use monitoring and alerting tools configured to look at their own system. When an alert is detected, they investigate and take corrective steps. When a dependency impacts a system, the impacted system has to manually contact the dependency owning team and convince them of impact and need to take steps. This approach may fall short in complex systems or due to the nature of the impact. Furthermore, the impact is not always apparent as it can range from total system failure to nothing at all. This creates opportunity for human error and judgment errors that carryforward small mistakes that, over time, can also lead to system failure.

Aspects described herein may address these and other shortcomings in existing solutions. Novel aspects discussed herein may facilitate improved monitoring of system health based on application dependencies, and may allow for reduced incident recovery time and increased system resiliency. Quickly singling out a source of brokenness in a complex system can avoid otherwise lengthy troubleshooting involving many other systems. This may reduce wasted effort spent by system administrators hunting a root cause. And through use of monitoring interfaces, aspects herein may provide monitoring of dependencies without requiring additional connections and modifications to integrate monitoring services.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

According to some aspects, a monitoring application may be configured to collect and report the operating status of a monitored application and each of the dependencies of the monitored application. Through use of existing monitoring interfaces provided by a monitoring interface application, the monitoring application may collect operating status without requiring modification of the underlying monitored application or dependencies. Aspects described herein may allow the monitoring application to determine a problem service that is a root cause of a system outage or other unhealthy state of the monitored application. The monitoring application may traverse a dependency tree for the monitored application to identify the problem service.

Other aspects described herein may provide methods for automatic on-boarding and/or configuration of the monitoring application for a given monitored application. Data lineage documentation, API call logs, and other resources may be parsed to determine dependencies of the monitored application. The system may map out the dependencies of the monitored application and build a logical dependency tree for use in identifying the root cause of performance issues. A crawler may automatically identify relevant monitoring interfaces provided by the monitoring interface application based on the mapped dependencies. Updates to the dependencies of the application, or to the available monitoring interfaces, may be automatically detected and used to keep the monitoring application up to date.

And other aspects described herein may provide methods that utilize machine learning techniques to determine patterns of performance based on system state information associated with performance events. System state information for an event may be collected and used to train a machine learning model based on determining correlations between attributes of dependencies and the monitored application entering an unhealthy state. During later, similar events, the machine learning model may be used to generate a recommended action based on past corrective actions. The monitoring application may also use information about baseline performance and unhealthy performance events to generate a health report using the trained model, indicating to a user information such as a predicted likelihood that the monitored application will enter an unhealthy operating state. This may allow the system to proactively provide users with information about and predict potential conditions that may cause the monitored application to become unhealthy. It may also allow the system to reactively generate recommended actions to restore the monitored application to a healthy state.

Still other aspects described herein relate to a method for testing resiliency of the system to outage of APIs and other services. An interceptor may intercept calls from a monitored application to an API that the application depends on. The intercepted calls may be modified and passed on, in such a manner that they return failed and/or unexpected results to the application. The interceptor may modify a result returned to an API call, such as by causing a portion of calls to timeout or yield errors. The interceptor may monitor performance of the application based on the modified calls and determine whether the monitored application is able to recover from the simulated API problems. The intercepted calls may be cached prior to modification, allowing the interceptor to regenerate the unmodified calls and insert them into a queue for processing if that monitored application is not able to recover. According to some aspects, the interceptor and simulated API problems may be used to train the machine learning model. The interceptor may act as a chaos agent, operating within the system to simulate problems at the various API dependencies (and other dependencies) of the monitored application. This may allow for testing on live deployments with reduced impact to users.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
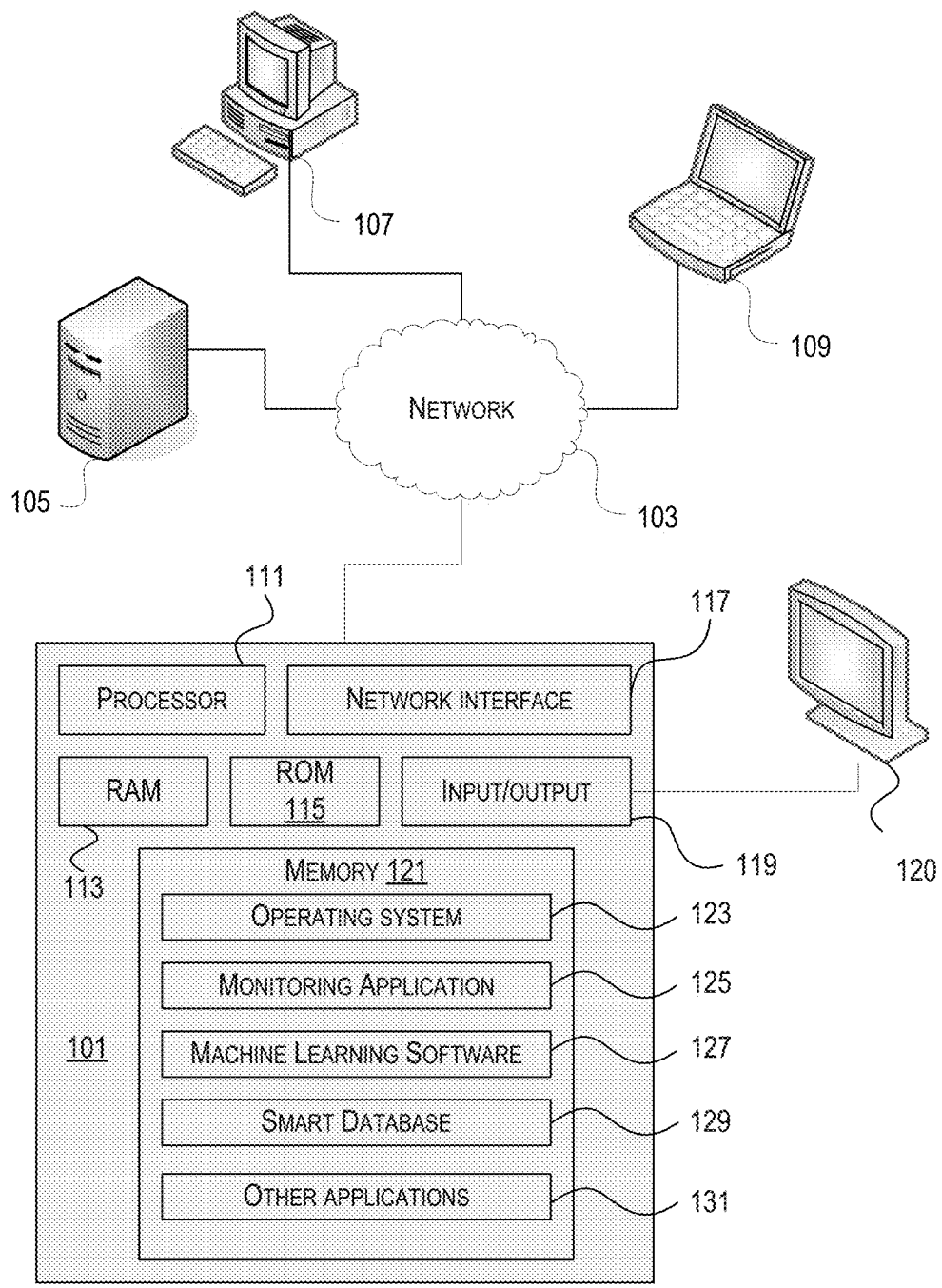
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described herein may relate to a monitoring application that integrates alerting, monitoring, and custom queries with mobile and other toolsets to allow a user the flexibility to monitor software systems at the level of their API dependencies, regardless of complexity. A monitored application (which may include a software application, an API, a platform, and other services) may be structured to rely on multiple other dependencies. The monitored application may request, retrieve, and modify data provided by other services, such as through an API provided by another application. Performance problems at these dependencies may result in the monitored application entering an unhealthy state, for example leading to the monitored application being unable to retrieve necessary data or timing out on user requests. The methods and techniques described herein may facilitate improved monitoring of system health based on application dependencies, and may allow for reduced incident recovery time and increased system resiliency.

Aspects discussed herein may provide methods and techniques for monitoring operating statuses of an application and its dependencies. A monitoring application may be configured to collect and report the operating status of the monitored application and each of the dependencies of the application. Through use of existing monitoring interfaces provided by a monitoring interface application, the monitoring application can collect operating status without requiring modification of the underlying monitored application or dependencies. Aspects described herein may allow the monitoring application to determine a problem service that is a root cause of a system outage or other unhealthy state of the monitored application.

Also discussed herein are dependency analyzer and discovery crawler methods and techniques that may be used to automatically configure and update the monitoring application. Further aspects discuss use of machine learning techniques to determine patterns of performance based on system state information associated with performance events. Similarly, a machine learning model may provide health reports relative to a baseline status of the monitored application. And other aspects described herein may provide methods and techniques for testing a response of the monitored application through modifications to API calls. Such tests may be used to train the machine learning model, according to some aspects.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, monitoring application 125 for instructing computing device 101 to perform aspects discussed herein, machine learning software 127, smart database 129, and other applications 131. Machine learning software 127 may be incorporated in and may be a part of monitoring application 125. In embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to methods and techniques for monitoring application health and dependencies in a computing system.

Application Dependency Monitor

According to some aspects, a monitoring application may be configured to collect and report the operating status of a monitored application and each of the dependencies of the application. Through use of existing monitoring interfaces provided by a monitoring interface application, the monitoring application may collect operating status without requiring modification of the underlying monitored application or dependencies. Aspects described herein may allow the monitoring application to determine a problem service that is a root cause of a system outage or other unhealthy state of the monitored application.

Figure 2:
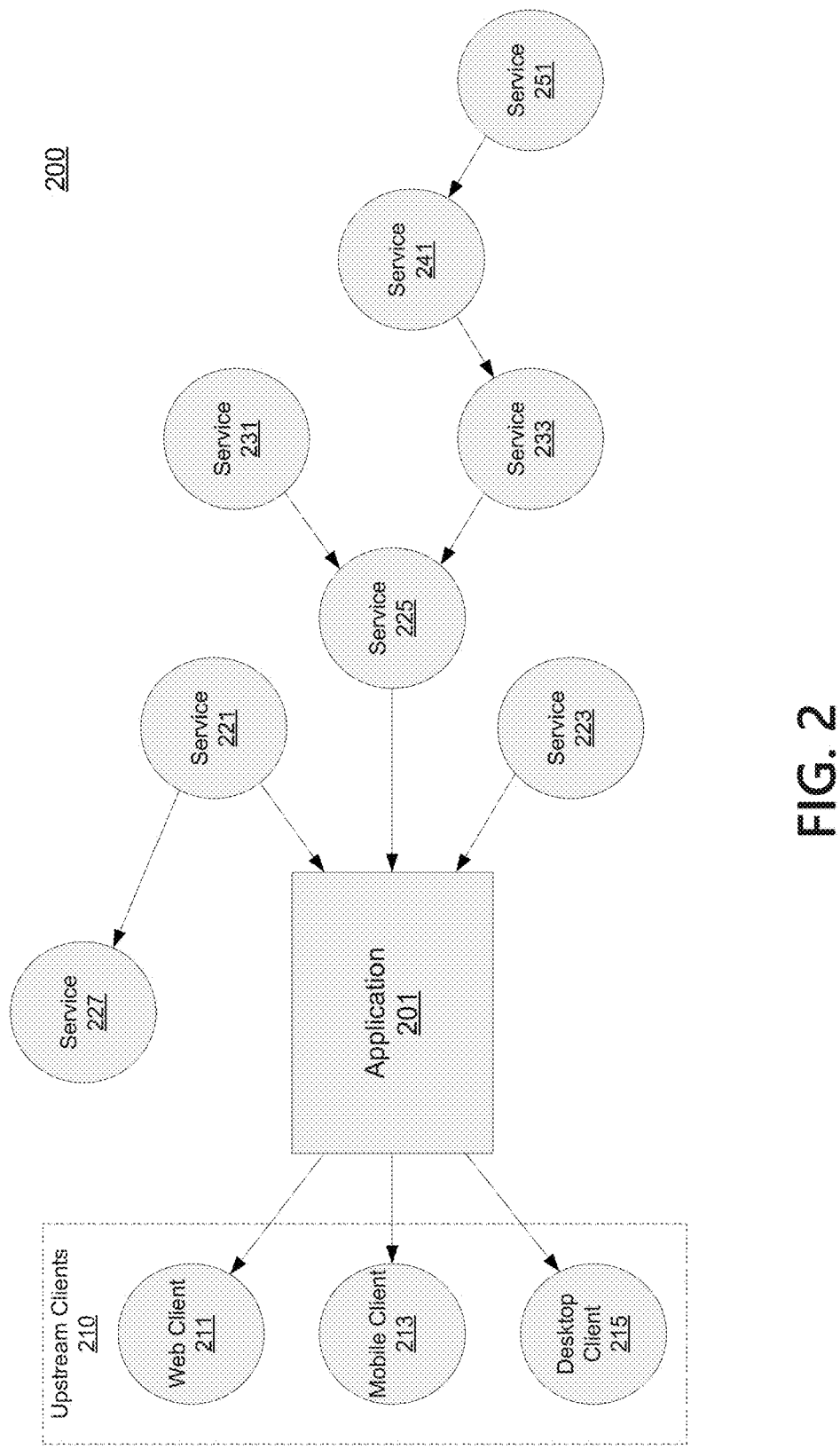
FIG. 2 depicts an example operating environment used to discuss illustrative aspects of systems and methods for monitoring and reporting status of dependencies of a target application according to one or more aspects of the disclosure.

FIG. 2 depicts an example operating environment 200 used to discuss various aspects of the monitoring application and related features described further herein. Application 201 (sometimes referred to as "monitored application" or "target application" herein) may be an application in a complex system that has multiple dependencies that it requires to process user requests and transactions. Although referred to as an "application," application 201 may be any suitable software application, platform, API, or other service that the user desires to monitor using the monitoring application.

In the example environment illustrated in FIG. 2, application 201 may support requests from upstream clients 210, including web client 211, mobile client 213, and/or desktop client 215. For example, application 201 may be an enterprise account frontend configured to accept requests from upstream clients 210 regarding transactions on the account. Application 201 is illustrated as having three dependencies: service 221, service 223, and service 225. For example, service 221 might provide account authentications, service 223 might provide user address information, and service 225 might provide balance and transaction information. Each may be referred to as an immediate, or direct, dependency of application 201. These dependencies may support other services/applications, such as how service 227 is depicted as relying on service 221. Each service relied on by application 201 may have its own further dependencies, which may be referred to as sub-dependencies of application 201. For example, service 225 may rely on data from service 231 (e.g., an account balance) and service 233 (e.g., transactions against the account). Service 233 is illustrated as depending further on service 241 (e.g., a messaging service to a transaction processor) which itself depends on service 251 (e.g., a third party transaction processor).

Figure 3A:
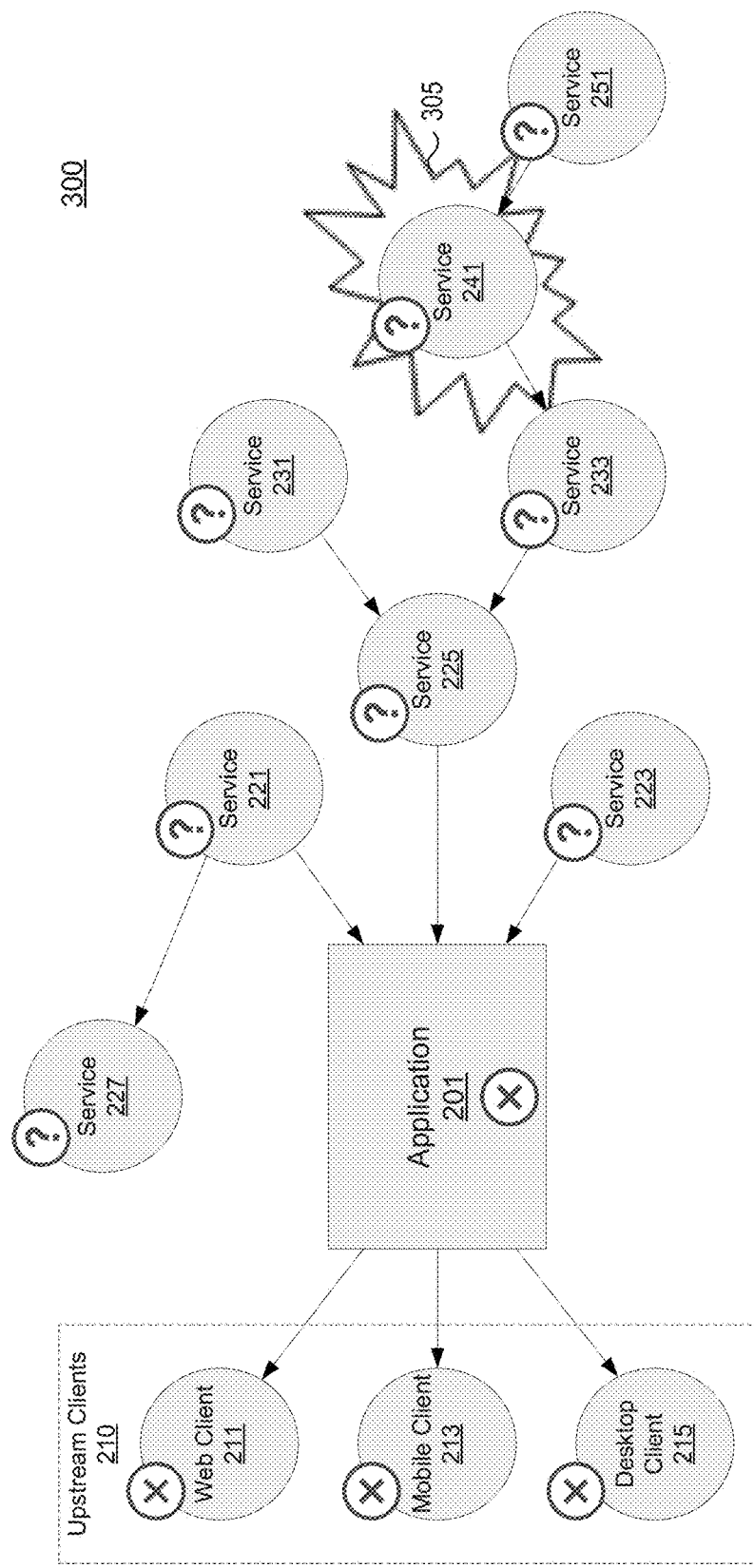
FIGS. 3A and 3B depict an example where a problem in the operating environment is causing the target application to behave in an unhealthy manner, according to one or more aspects of the disclosure.

FIG. 3A depicts an example where a problem in operating environment 300 (which may correspond to operating environment 200 of FIG. 2) is causing the target application to behave in an unhealthy manner Upstream clients 210 may be reporting errors due to requests to application 201. To upstream clients 210, applications 201 appears to be the source of errors. However, the unhealthy state of application 201 may be due to failures at one or more dependencies. A problem 305 at a sub-dependency of application 201 (e.g., at service 241) may cascade downstream and impact a line of dependencies leading back to application 201 (e.g., service 233, service 225). Though their ability to provide good results may be impacted, application 201, service 225, and service 233 may be otherwise healthy but for the problem at service 241.

Figure 3B:
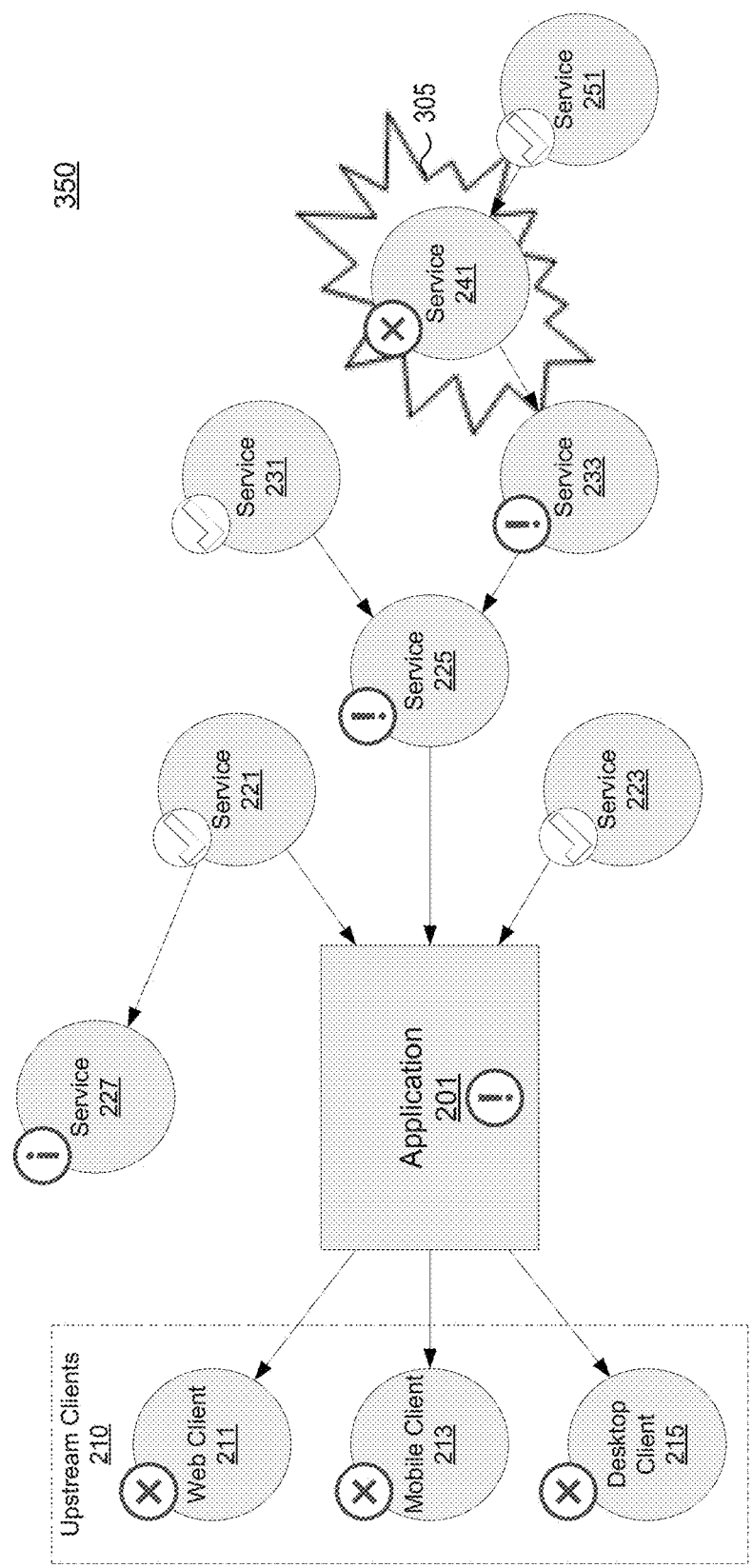

As illustrated in FIG. 3B, according to aspects described herein, the monitoring application may be configured to monitor operating status of application 201 and each of its dependencies and sub-dependencies (collectively, dependencies). In environment 350, the monitoring application may determine the operating status of each service in the system (including application 201). Operating status of a given service may be determined using a monitoring interface associated with that service. Monitoring interfaces may be provided by a monitoring interface application/framework, such as Splunk or Elastic, and may provide one or more metrics regarding the operating status of the corresponding service. The monitoring application may use the monitoring interfaces to determine if the service has a healthy or unhealthy operating status. For example, the monitoring application may use a set of unhealthy operating status thresholds associated with the metrics to recognize when the service is in an unhealthy, problematic operating state. The monitoring interfaces may also allow the monitoring application to discern a source or nature of service disruption, and the operating status of a service may be that the service is otherwise healthy but for a problem dependency.

In the example of FIG. 3B, problems detected at upstream clients 210 may lead to a system administrator for application 201 seeking to discover a source of the problems. Application 201 may have a generally healthy operating status but for data needed from dependencies, and thus may be determined to have an unhealthy operating status. The monitoring application may check the operating status of each immediate dependency, and may see that service 221 and service 223 are reporting no problems (e.g., have a healthy operating status). The monitoring application may see that service 225 is reporting problems, even if service 225 is functional. The monitoring application may traverse service 225's dependencies, and see that service 231 is not reporting problems while service 233 is reporting problems. The monitoring application may continue the chain to inspect service 241 as a dependency of service 233, continuing to hunt for the source of the problem. Service 241 may be reporting problems, but a check of service 251 (a dependency of service 241) may reveal that service 251 is ok. Thus, because service 251 has a healthy operating state, the monitoring application can determine that service 241 is the root source of problem 305. Having determined a root source, the monitoring application can update the status of application 201, service 225, and service 233 to indicate that they are healthy but for their dependency on service 241. Service 241 may be output by the monitoring application in a notification as a problem dependency.

Figure 4:
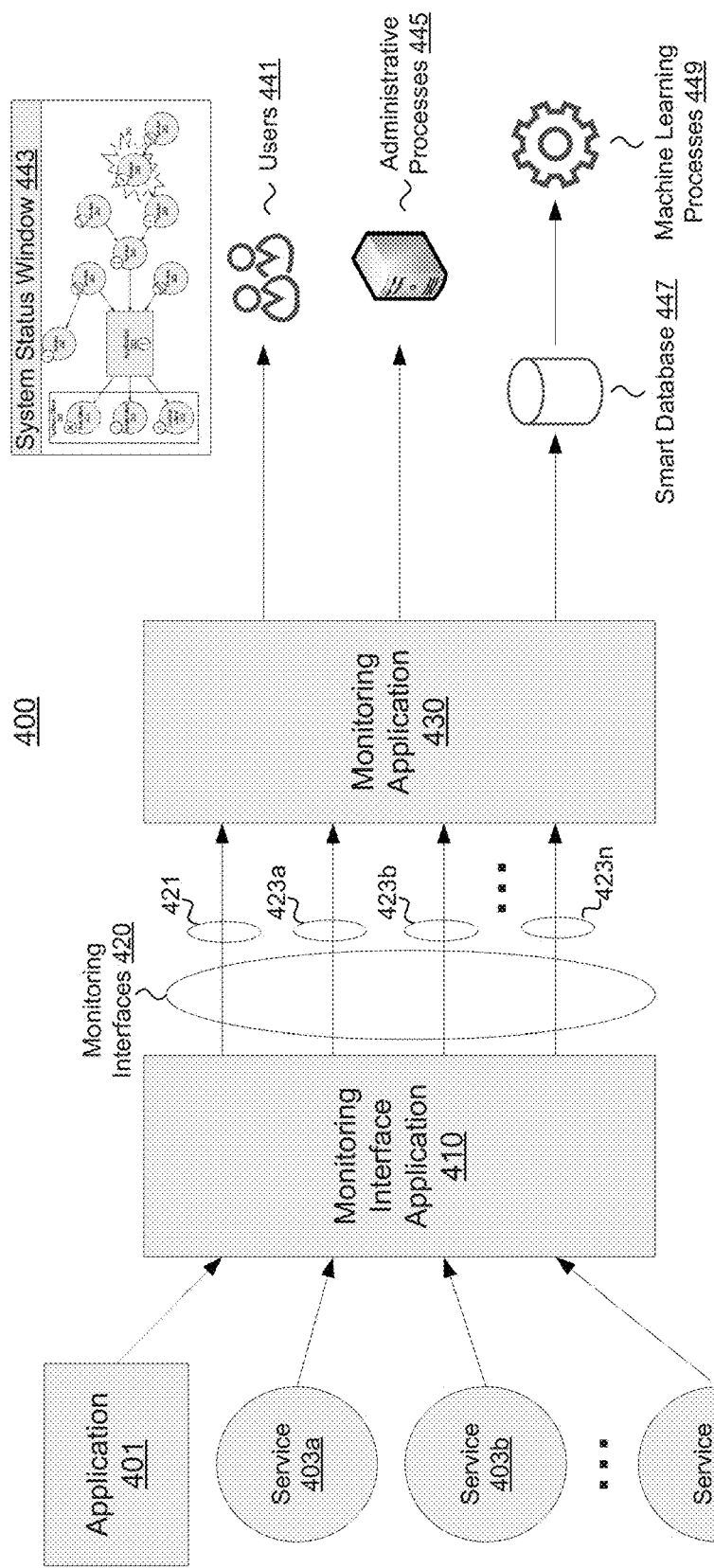
FIG. 4 depicts an example architecture for a monitoring application according to one or more aspects of the disclosure.

FIG. 4 depicts an example architecture 400 for a monitoring application 430 according to one or more aspects of the disclosure. Application 401 (also referred to as the monitored application or target application) and services 403a-n may be set up for monitoring by a monitoring interface application 410. Services 403a-n may correspond to dependencies (and sub-dependencies) of application 401. Application 401 and services 403a-n may correspond to application 201 and the illustrated services of FIGS. 2, 3A, and 3B.

Monitoring interface application 410 may be configured to monitor one or more attributes or operating metric of application 401 and service 403a-n. Example monitoring interface applications include Spunk and Elastic's ELK framework. Application 401 and services 403a-n may be designed and/or configured to allow monitoring interface application 410 access to the attributes and or operating metrics through APIs or other means. Monitoring interface application 410 may be used to facilitate application and service monitoring, and the monitoring interfaces 420 may be made available to other applications that may make use of attribute and operating metrics associated with application 401 or service 403a-n. Monitoring interfaces 420 may comprise one or more monitoring interfaces 421 associated with application 401, and one or more monitoring interfaces 423a-n associated with services 403a-n. Each monitored service (e.g., application 401 or services 403a-n) may be associated with one or more monitoring interfaces that track different attributes and/or operating metrics associated with the respective service. Monitoring interfaces 420 may be used to create dashboards allowing a user to view the various attributes and operating metrics collected by monitoring interface application 410.

Users and other applications may interact with monitoring interface application 410 using a query protocol associated with monitoring interface application 410. Monitoring interfaces 420 may be used by users and other applications via suitable queries structured to instruct monitoring interface application 410 to retrieve desired attributes and operating metrics associated with a monitored application/service.

Although a single monitoring interface application 410 is illustrated in FIG. 4, it should be appreciated that multiple monitoring interface applications may be used without departing from the concepts described herein. For example, application 401 and service 403a may be onboarded for monitoring via a first monitoring interface application, such as Splunk. Service 403b may be onboarded for monitoring via another monitoring interface application, such as the Elastic ELK framework. Monitoring application 430 may utilize monitoring interfaces 420 provided by multiple, different monitoring interface applications. The different monitoring interface applications may utilize different query protocols, and monitoring application 430 may be configured with the appropriate queries to retrieve attributes and operational metrics via monitoring interfaces 420.

Monitoring application 430 may be configured to utilize monitoring interfaces 420 to monitor the status of application 401 and its dependencies, services 403a-n. Monitoring application 430 may use monitoring interface(s) 421 to assess an operating status of application 401. Similarly, monitoring application 430 may use monitoring interfaces 423a-n to assess an operating status of application 401's dependencies. Monitoring application 430 may be configured to respond to commands from users 441 and provide reports. One example of a report provided to users may be system status window 443, which may comprise a visualization of application 401 and its dependencies in the same manner as FIG. 3B. Monitoring application 430 may also provide results/reports regarding system operating status to administrative processes 445, which may further process the operating data and/or automate portions of system administrative. As will be discussed further below with respect to FIG. 12, monitoring application 430 may also interface with intelligent services components including smart database 447 and machine learning processes 449 to enable use of artificial intelligence and/or machine learning techniques to generate predictions regarding system operating status and corrective actions.

Monitoring application 430 may support several user interfaces for receiving user requests and outputting reports. For example, monitoring application 430 may provide a graphical user interface configured to accept commands and display reports. As another example, monitoring application 430 may implement a chat bot designed to respond to user text commands with appropriate statistics. The chat bot may utilize natural language processing of queries to provide users with a more approachable user interface.

Some example commands for controlling the monitoring application chat bot include:

@mon appl dd—check dependencies
@mon appl kpi—check key performance indicators
@mon appl stats—check statistics
@mon appl tps—check transactions per second
@mon appl statements_chart 15m—view statements_chart over last 15 minutes
@mon appl transactions_chart 30m—view transactions_chart over last 30 minutes
@mon appl payments_chart 60m—view payments_chart over last 60 minutes Additionally, monitoring application 430 may support a mobile user interface, enabling system administrators to monitor and troubleshoot system operation more flexibly. The mobile user interface, and other graphical user interfaces, may be configured to support similar commands to those listed above (and many others).

The monitoring application 430 may generate reports that provide indications of system operating health. For example, reports may indicate whether application 401 or any of the dependencies 403a-n are operating with errors beyond an unhealthy operating status threshold. Monitoring application 430 may provide many different, configurable reports designed to provide users with the right information to diagnose and troubleshoot problems. Some reports may be configured to provide specific information typically requested by users. Others may result from dynamic determinations of what the most relevant and/or problematic system attributes are at a given time, and may present that information to the user. For example, if a user requests a dependency check for a system having 20+ dependencies, the system may provide a reduced report listing dependencies that are operating at below average performance levels or are otherwise indicating problems. Monitoring application 430 may report any suitable operating metric relevant to performance and health of application 401 and/or service 403a-n. Some example operating metrics may include: number of transactions received per second, number of transactions handled per second, error rate, latency, network utilization, network speed, memory utilization, processor utilization, other resource utilization, latencies to individual dependencies, error rates of individual dependencies, error messages of an application or service, error messages of a dependency, and/or any other suitable operating metrics.

According to some aspects, monitoring application 430 may be configured to identify a potential root cause of a performance impacting event. Monitored application 401 may provide information and service in support of other applications, such as the relationship between monitored application 201 and upstream dependencies 210 in FIG. 2. Upstream users may report problems, or problems may be detected based on the operating status of monitored application 401. The operating status of monitored application 401 may be healthy but for performance problems at downstream dependencies. Monitoring application 430 may utilize monitoring interfaces to determine an operating status of application 401 and its dependencies to determine a root cause and allow system administrators to quickly establish that application 401 is not itself having problems, besides its reliance on a downstream dependency that is causing the issue.

Figure 5:
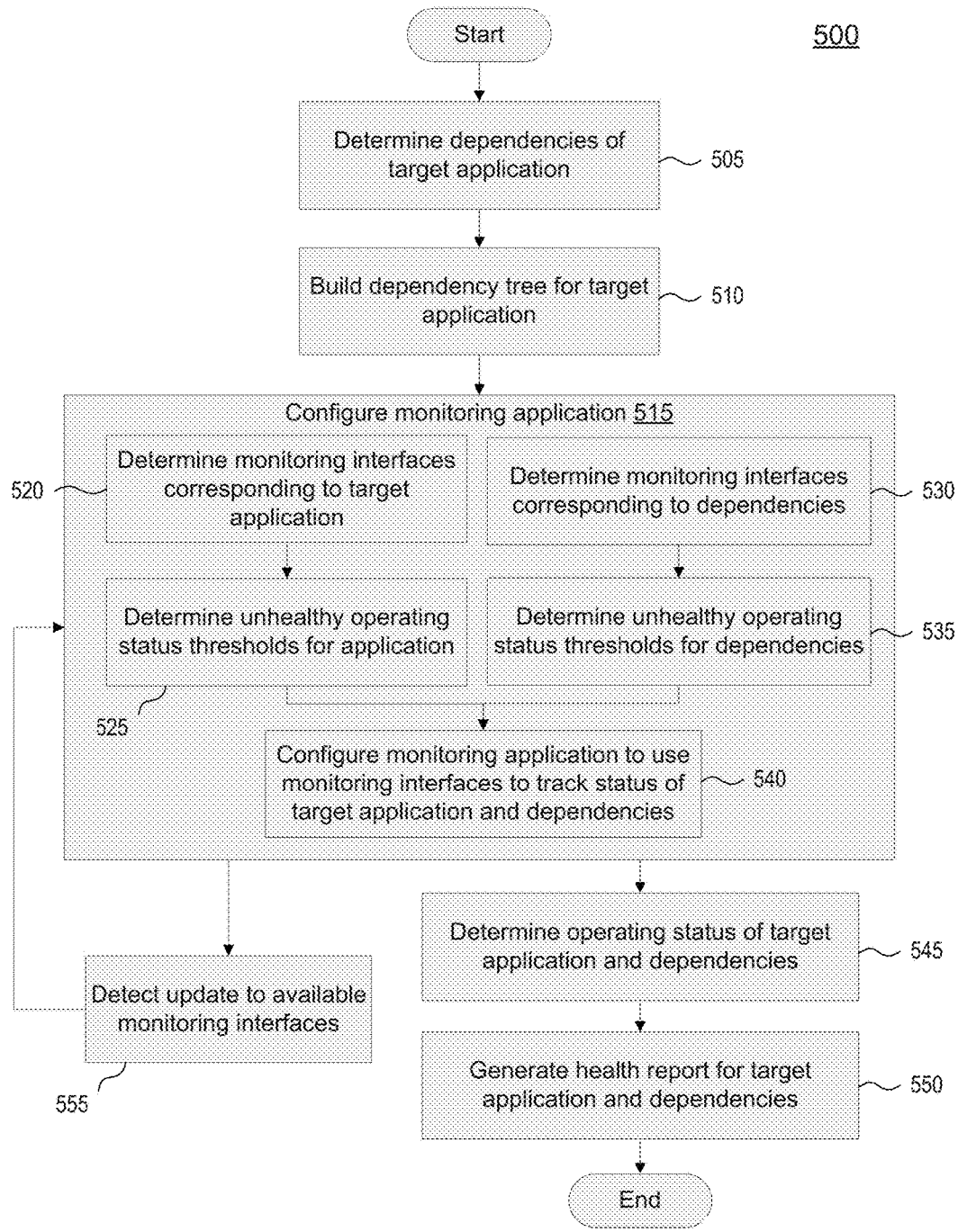
FIGS. 5 and 6 depict flowcharts illustrating example methods for monitoring and reporting status of dependencies of a target application according to one or more aspects of the disclosure.
Figure 6:
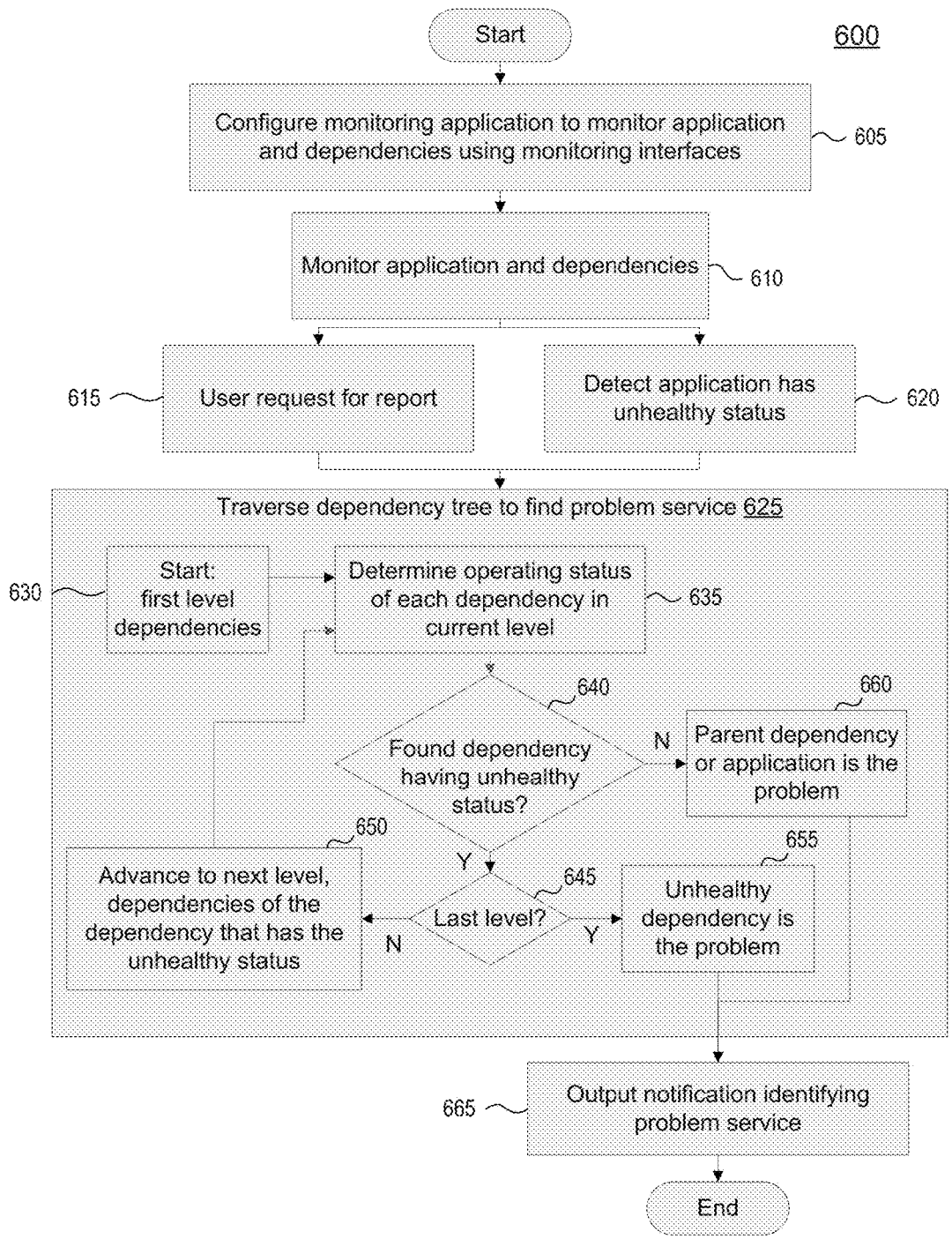

Monitoring application 430 may determine the potential root cause of the problems by traversing a dependency tree associated with monitored application 401. Monitoring application 430 may monitor the operating status of monitored application 401. Based on determining that monitored application 401 has errors or reduced performance, monitoring application 430 may check operating status of each first level dependency of monitored application 401 (based on, e.g., traversing nodes in a dependency tree). When a first level dependency is identified as having errors and/or an unhealthy operating status, monitoring application 430 may proceed down a layer to check operating status of each dependency (second level dependencies) of the first level dependency determined to have problems. If monitoring application 430 identifies a problem node at that layer, it can continue to advance to further layers of the dependency tree. Once monitoring application 430 identifies a layer without any problem dependencies, or reaches a final layer, monitoring application 430 can conclude that a problem dependency of the prior layer is a potential root cause of application 401's performance issues. FIGS. 5 and 6 illustrate example methods through which monitoring application 430 may identify and surface a potential root cause (or "problem dependency") of a performance impacting event.

FIG. 5 depicts a flowchart illustrating an example method 500 to determine operating statuses of a target application and its dependencies and generate a corresponding system health report. Method 500 may be a computer-implemented method, and may be implemented by one or more computing device such as computing devices 101, 105, 107, and/or 109 of FIG. 1. Method 500 may be performed by a monitoring device that implements monitoring application 430, or other suitable device.

At step 505, the monitoring device may determine dependencies of a target (monitored) application. The monitored application may correspond to a software application, API, and/or other suitable service that the user desires to monitor. Dependencies may comprise services that the monitored application relies on to provide and/or process information. Example dependencies include APIs, platforms, hardware resources, network resources, third party services, and/or any other service that application depends on to provide and/or process information associated with operation of the application. Dependencies of an application may be based on information previously generated by the system or system admins, so the monitoring device may leverage existing documentation to determine dependencies of the application. According to some aspects discussed further herein, the monitoring device may implement dependency analysis features to automatically identify dependencies for the application based on one or more sources of dependency information for the monitored application and its respective dependencies. These features are discussed further herein with respect to FIGS. 7-10.

At step 510, the monitoring device may build a dependency tree for the target application. Based on the dependencies determined for the application, the monitoring device may build a dependency tree indicating the function and/or logical relationship between the monitored application, its immediate dependencies, and further dependencies of those immediate dependencies. The dependency tree may be logically represented as a series of nodes, with each node corresponding to the application, an immediate dependency, or a further dependency. The depictions in FIGS. 2, 3A, and 3B may visually represent the structure of an exemplary dependency tree for application 201. The dependency tree may facilitate parsing and traversal of the services that the application depends on during a process to identify potential root causes of service impacting events and/or otherwise generate health reports regarding operation of the system and/or the monitored application.

Building the dependency tree for the target application may take into account and avoid redundant and/or circular dependencies. The dependency mapping logic may consider whether a dependency is already present in the dependency tree, and may remove it from the tree and/or avoid adding the redundant dependency. This may allow the monitoring application to avoid re-checking a dependency whose operating status has already been checked. The monitoring device may also be configured to avoid circular dependencies, detecting that a dependency structure would cause a loop in the dependency tree. The monitoring device may avoid adding the relationship that would complete the loop, avoiding complications of having a loop in the tree graph while still allowing each dependency to be traversed. Additional aspects are discussed further herein with respect to FIGS. 7-9.

At step 515, the monitoring device may configure a monitoring application, such as monitoring application 430, to monitor the target application, such as application 401. Configuring the monitoring application may comprise on-boarding the monitored application by configuring the monitoring application to track the operating status of the monitored application. As explained further in steps 520-540, the monitoring device may on-board the monitoring application by configuring the monitoring application to monitor the target application using multiple monitoring interfaces provided by a monitoring interface application, such as Splunk.

At step 520, the monitoring device may determine monitoring interfaces corresponding to the target application. A user who is configuring the monitoring application may identify the monitoring interfaces (e.g., Splunk queries) that should be used to monitor the operating status of the target application. On-boarding for an application (or other service/dependency) may comprise capturing a query file associated with a monitoring interface application and importing those queries into the monitoring application. The monitoring interfaces may have been configured and/or created by the administrator, or they may have been created by other users that are monitoring operation of the system, target application, and/or dependencies. Additionally, and/or alternatively, the system may automatically determine monitoring interfaces to use for the target application and/or dependencies based on monitoring interfaces provided by the monitoring interface application Similarly, at step 530 the monitoring device may determine monitoring interfaces corresponding to dependencies of the target application. As with determining monitoring interfaces for the target application, the system may receive user selection of monitoring interfaces to use for each dependency and/or automatically determine appropriate monitoring interfaces. Particularly, if a given dependency has been previously on-boarded to the monitoring application, the system may leverage that prior configuration to determine which monitoring interfaces to use to monitor operating status of the given dependency.

As mentioned above, determining monitoring interfaces corresponding to the target application and/or dependencies in steps 520 and/or 530 may comprise automatically determining suitable monitoring interfaces for the application/dependencies. A discovery crawler may automatically identify relevant monitoring interfaces provided by the monitoring interface application based on the mapped dependencies. Updates to the dependencies of the application, or to the available monitoring interfaces, may be automatically detected and used to keep the monitoring application up to date. As one example, the system may automatically determine the monitoring interfaces to use based on an existing monitoring dashboard. As another example, the system may determine the monitoring interfaces to use based on a prior configuration of the monitoring application to monitor the target application and/or dependency as part of a configuration of the monitoring application to monitor another application that depends on aspects of the target application. This may allow administrators to leverage prior onboardings of other applications to quickly on-board the monitoring application for a new target application and its dependencies.

A discovery crawler may parse the monitoring interface applications used in a network to monitor target applications and services. Dashboards created for application and service monitoring may be leveraged to automatically determine the monitoring interfaces to use in the monitoring application. One advantage of this automatic process is that the monitoring application may be kept up to date as new monitoring interfaces (e.g., revised/new Splunk queries) are perfected and deployed for system monitoring by administrators. And this may allow the system to automatically update the monitoring application to monitor new dependencies that are identified, allowing a more complete picture of the health and status of the target application and system.

At steps 525 and 535, the monitoring device may determine thresholds associated with the operating status of the target application and/or its dependencies. The thresholds may comprise unhealthy operating status thresholds, and may include values associated with one or more metrics that indicate that an application or other service has an unhealthy operating status. Unhealthy operating status thresholds may be set by system administrators as part of on-boarding the monitoring application for the target application and dependencies. Additionally, and/or alternatively, the discovery crawler features discussed above may allow the monitoring device to automatically determine thresholds associated with the information provided by a given monitoring interface. For example, a user may have configured a Splunk query for a first API designed to alert when a response latency of the first API rises above a certain value, e.g., 100 ms. The monitoring device may identify that the prior user configured the monitoring query to use a response latency threshold, and may determine that the monitoring application should use a similar threshold to determine when the application/dependency enters an unhealthy state of performance. However, different applications and administrators may have different requirements and/or definitions of what constitutes an unhealthy operating status. The monitoring device may determine that a first threshold value is being used by an existing monitoring interface for a service dependency, but the administrator may wish to use a second threshold value based on the same metric to alert on decreased performance. Configurable thresholds may allow users to better identify when the target application and/or dependencies have an unhealthy operating status, and may allow users to proactively detect conditions that may lead to the application and/or dependency having a future unhealthy operating status.

At step 540, the monitoring device may configure the monitoring application to use the determined monitoring interfaces to track the operating status of the target application and its dependencies. This may comprise configuring the monitoring application to retrieve one or more performance metrics provided by the monitoring interfaces relevant to the target application and/or dependency service. By configuring the monitoring application to utilize the monitoring interfaces, administrators can avoid the need to develop new monitoring APIs just to allow the monitoring application to access the data it needs to generate health reports. Leveraging existing monitoring interfaces may avoid potentially disruptive changes to the underlying target application and/or dependency services. The monitoring application can pull operating metrics from the monitoring interfaces rather than hooking into processes of the target application and/or dependency services. The monitoring application may make queries against the monitoring interface application rather than making queries against the monitored service itself.

Automatic updating of the available monitoring interfaces to monitoring operating statuses of the target application and dependencies may be provided at step 545 of method 500, where the system may detect an update to the available monitoring interfaces and proceed to re-configure the monitoring application.

At step 550, the configured monitoring application may determine operating statuses of the target application and its dependencies using the monitoring interfaces. At step 555, the monitoring application may generate a health report for the target application and its dependencies based on the determined operating statuses. Health reports regarding the operating status of the target application and the dependencies may support proactive, rather than just reactive, monitoring of the target application. An administrator, other user, administrative process, and/or intelligent service may act on the health report to take steps that may prevent and/or reduce the likelihood of the target application entering an unhealthy operating state.

Continuous monitoring may enable the detection of error trends. Alerts and notifications may quickly surface problems for the system and/or administrator to address. While some timeouts or errors are expected even during typical operation, the monitoring application may facilitate the detection of unhealthy operating statuses that may be service impacting. As discussed further herein, with respect to FIG. 6, the monitoring application may be configured to parse the dependency tree to identify a potential root cause of an unhealthy operating status and generate a notification of the same.

FIG. 6 depicts a flowchart illustrating a method 600 of determining a problem service when a monitored application has an unhealthy operating status, based on analyzing the monitored application and its dependencies. Method 600 may be performed by any suitable computing device, such as a monitoring device, as was described above with respect to method 500.

At step 605, the monitoring device may configure a monitoring application to monitor a target application and its dependencies using multiple monitoring interfaces. Step 605 of method 600 may correspond to step 515 of FIG. 5, along with its sub-steps 520, 525, 530, 535, and 540.

At step 610, the monitoring device may monitor the operating status of the monitored target application and its dependencies. The monitoring device may determine an operating status of the target application and dependencies based on operating metrics retrieved via the monitoring interfaces. Steps 610 and subsequent steps may be performed using a monitoring application as discussed above.

At steps 615 and 620, the monitoring device may determine to generate a health report for the monitored application. In step 615, the monitoring device may receive a user request to generate a report. The request may indicate that the user wants to see a dependency health report to identify a root cause of a service impacting event affecting the target application. In step 620, the monitoring device may detect that the application has an unhealthy status and determine to generate a report and/or notification identifying a potential root cause of the unhealthy state of the application. The monitoring device may determine that the monitored application is not itself generating errors, but that the operating status of the monitored application indicates that a downstream dependency of the monitored application may be causing the monitored application to have the unhealthy operating status.

At step 625, the monitoring device may traverse a dependency tree associated with the target monitored application to identify a potential root cause of the performance problems. By walking through the dependency tree, the monitoring device may determine which dependencies have unhealthy operating statuses and identify a potential root cause of the unhealthy statuses. The tree traversal process may comprise walking through nodes of the dependency tree that each correspond to the monitored application and/or the services the monitored application depends on.

At step 630, the monitoring device may begin the tree traversal process at a first level of the dependency tree. The first level of the dependency tree may comprise immediate dependencies of the target application. The immediate dependencies may be APIs and/or other services that are directly called by the monitored application during operation.

At step 635, the monitoring device may determine operating statuses of each service/dependency included in the current level of the dependency tree (beginning after step 630 at the first level of the dependency tree). The operating status of each service may be determined by the monitoring application based on the monitoring interfaces as configured in step 605. For each service, the monitoring application may determine whether the service has an unhealthy operating status. As described above, the monitoring application may be configured with one or more operating status thresholds which the monitoring application can compare to operational metrics retrieved via the monitoring interfaces. If a metric exceeds or otherwise meets the criteria for having an unhealthy operating status, the monitoring application may determine that the service has an unhealthy operating status. If operational metrics associated with the service fall below or otherwise do not meet the criteria for having an unhealthy operating status, the monitoring application may determine that the service has a healthy operating status in the absence of other factors that indicate that the service has an unhealthy status. In addition to, and/or as an alternative to, comparing metrics to thresholds, the monitoring application may inspect error messages associated with the service to determine whether a given service has an unhealthy operating status.

At step 640, the monitoring device may determine whether a dependency in the current level of the dependency tree has been determined to have an unhealthy operating status. This determination may enable the monitoring application to identify the potential root cause of the system performance problems. The tree traversal process may proceed based on whether a dependency in the current level has an unhealthy status, and based on whether all dependencies in the current level are determined to have a healthy status.

At step 645, if all dependencies in the current level of the dependency tree are found to have a healthy operating status, then the monitoring application can determine that a parent dependency of the prior level is the problem service likely causing the impact to the operating status of the monitored application. If the current layer is the first layer, then the monitoring application can determine that the monitored application itself is the problem service.

If, instead, the monitoring application identifies a dependency of the current level that has an unhealthy operating status, at step 650 the monitoring application may determine whether it has reached a last level of the dependency tree. If the current level is the last level of the tree, the monitoring application may determine at step 655 that the unhealthy dependency of the current level is the problem service.

If the current level is not the last level, at step 660 the monitoring application may advance to a next level of the tree. The next level may be limited to the further dependencies of the particular dependency that was determined to have an unhealthy operating status in step 640. Then the monitoring application may loop back to step 635 and determine the operating status of each further dependency in the next level.

As an example, consider the exemplary environment illustrated in FIG. 3A and discussed above. At step 620, the monitoring application may determine that application 201 has an unhealthy operating status. The root cause of the unhealthy operating status of application 201 may be problem 305 at service 241, a sub-dependency of application 201 three levels deep. At step 630, the tree traversal process may begin at a layer comprising services 221, 223, and 225—the immediate dependencies of application 201. At step 635, the monitoring application may determine the operating status of each of service 221, service 223, and service 225. Because the problem 305 does not impact services 221 and 223, the monitoring application may determine that they have a healthy operating status. The monitoring application may determine that service 225 has an unhealthy operating status, since problem 305 at service 241 is impacting operation downstream. At step 640 the monitoring application determines that it found a dependency having an unhealthy operating status (service 225), which is not the last level (step 650). At step 660 the monitoring application may advance to the next level (service 231 and service 233) of the dependency tree, assessing the status of nodes that depend from service 225. Returning to step 635, the monitoring application may determine that service 231 has a healthy status but that service 233 has an unhealthy status. Through steps 640, 650, and 660, the monitoring application may advance to the next level of the dependency tree beyond service 233, which comprises only service 241 in the example. Returning again to step 635, the monitoring application may determine that service 241 has an unhealthy operating status, and advance to the final layer of the dependency tree that corresponds to dependents of service 241, a layer comprising service 251. The monitoring application may determine that service 251 has a healthy operating status, since service 305 is upstream from problem 305 and not impacted. At step 640, the monitoring application may determine that no dependencies at the current level have an unhealthy operating status and thus may conclude at step 645 that service 241, the parent dependency of the current level, is the problem service and likely root cause of the unhealthy operating statuses in the system.

At step 665, having determined the problem service as a likely root cause of the unhealthy operating statuses in the system, the monitoring device may generate output identifying the problem service. For example, the monitoring device may generate a health report that flags the problem service and associated operating metrics that relate to the determination that the problem service has an unhealthy status. Error messages and other metrics related to the problem service may also be provided to assist in troubleshooting why the problem service has an unhealthy operating status and determining suitable corrective actions.

Thus, according to some embodiments a computer-implemented method for monitoring operating status of a first application and its dependencies may be provided. The method may be performed by a monitoring device or other computer system. The computer system may determine a plurality of services associated with the first application. The plurality of services may be organized as a dependency tree, and may include one or more first services corresponding to one or more immediate dependencies associated with the first application and one or more second services corresponding to one or more sub-dependencies associated with the first application. Each of the second services may correspond to a respective dependency of a corresponding immediate dependency or sub-dependency associated with the first application. The computer system may configure a monitoring application to monitor the plurality of services using a plurality of monitoring interfaces.

The computer system may automatically identify, using the monitoring application, a problem service of the plurality of services through a tree traversal process. The tree traversal process may begin at a first layer of the dependency tree corresponding to the one or more immediate dependencies. The tree traversal process may include determining, based on the plurality of monitoring interfaces, an operating status of each service included in a current layer of the dependency tree. Based on whether a first service of the current layer is identified as having an unhealthy status, and based on whether each service of the current layer is identified as having a healthy status, the traversal process may proceed. When the first service is identified as having an unhealthy status, the computing system may continue to traverse the dependency tree to identify the problem service by advancing to a next layer of the dependency tree. The next layer of the dependency tree may comprise services corresponding to a plurality of dependencies of the first service. When each service of the current layer is identified as having a healthy status, the computer system may identify a parent dependency service, of an immediately prior layer of the dependency tree, that has an unhealthy status as the problem service. The computing system may generate, by the monitoring application, a notification indicating that the parent service is the problem service.

In some implementations, at least one service of the plurality of services may correspond to an Application Programming Interface (API) associated with a resource utilized by the first application. At least one service of the plurality of services may correspond to a network utilized by the first application to communicate with another dependency. The first application may comprise an Application Programming Interface (API).

In some implementations, determining the operating status of a given service may comprise determining one or more of: whether a resource associated with the corresponding dependency is accessible; a response latency associated with requests to the corresponding dependency; an error rate associated with requests to the corresponding dependency; and/or an error state or error message provided by the corresponding dependency. A given service may be determined to have an unhealthy status based on whether one or more metrics associated with the corresponding dependency satisfy one or more operating status thresholds. Configuring the monitoring application to monitor the plurality of services may include configuring the monitoring application to associate the one or more operating status thresholds with the corresponding dependencies. In some implementations, determining the operating status of a given service may be based on a predetermined time period prior to a current time.

The plurality of monitoring interfaces may comprise a first monitoring interface configured to enable monitoring of a second service utilized by the first application. The first monitoring interface may be generated by a first monitoring interface application and be configured to determine at least one metric associated with the service. Configuring the monitoring application to monitor the plurality of services using the plurality of monitoring interfaces may comprise configuring the monitoring application to utilize the first monitoring interface through at least one monitoring query associated with the first monitoring interface application. The plurality of monitoring interfaces may further comprise a second monitoring interface configured to enable monitoring of a third service utilized by the first application. The second monitoring interface may be generated by a second monitoring interface application and may be configured to determine at least one metric associated with the third service. The second monitoring interface application may be different from the first monitoring interface application and utilize a different query protocol.

In some implementations, determining the operating status of each service included in the current layer of the dependency tree may comprise determining whether the operating status of a given service, of the services in the current layer, has previously been determined by the monitoring application during the tree traversal process. Based on determining that the operating status has already been determined, the computing system may use the previously determined operating status for the given service.

In some implementations, the computing system may generate, by the monitoring application, a health report for the first application by traversing the dependency tree to determine an operating status of each service of the plurality of services. The monitoring application may be configured to periodically generate the health report for the first application. Determining, as part of the tree traversal process, the operating status of each service included in a current layer of the dependency tree may be based on operating statuses determined during generating the health report.

According to some embodiments another computer-implemented method for monitoring operating status of a first application and its dependencies may be provided. The method may be performed by a monitoring device and/or a computer system. The computer system may determine a plurality of services associated with a first application. The plurality of services may comprise one or more first level services corresponding to one or more first level dependencies of the first application; one or more second level services corresponding to one or more second level dependencies of the first application, wherein each second level dependency is a dependency of a corresponding first level dependency; and one or more third level services corresponding to one or more third level dependencies of the first application, wherein each third level dependency is a dependency of a corresponding second level dependency. The first level dependencies may correspond to immediate dependencies of the first application. The first level dependencies may correspond to sub-dependencies associated with the first application. Each sub-dependency of the first level dependencies may be a dependency of a respective dependency of a prior level associated with the first application. The computer system may configure a monitoring application to monitor the plurality of services using a plurality of monitoring interfaces.

The computing system may generate, based on the plurality of monitoring interfaces, a health report for the first application. The computing system may generate the health report by traversing the dependencies. The system may determine an operating status of the first application. The system may determine, based on the plurality of monitoring interfaces, an operating status of each of the first level dependencies and identify a first service of the first level services as having an unhealthy operating status. The system may determine, based on the plurality of monitoring interfaces, an operating status of each of the second level dependencies that are dependencies of a first level dependency corresponding to the first service, and identify a second service, of the second level services that correspond to dependencies of the first level dependency, as having an unhealthy operating status. The system may determine, based on the plurality of monitoring interfaces, an operating status of each of the third level dependencies that are dependencies of a second level dependency corresponding to the second service, and determine that each third level service has a healthy operating status. Based on determining that each third level service has a healthy operating status, the system may identify the second service having the unhealthy operating status as a problem service. And the system may generate a notification indicating that the second service is a problem service based on the health report.

According to some embodiments, another method may be provided for monitoring operating status of a first application and its dependencies may be provided. The method may be performed by a monitoring device and/or a computer system. The computing system may determine a plurality of dependency nodes associated with a first application and organized as a dependency tree. The plurality of dependency nodes may comprise one or more first nodes corresponding to one or more immediate dependencies associated with the first application; and one or more second nodes corresponding to one or more sub-dependencies associated with the first application, wherein each of the second nodes corresponds to a respective dependency of a corresponding immediate dependency or sub-dependency associated with the first application. At least one dependency node of the plurality of dependency nodes may correspond to an Application Programming Interface (API) associated with a resource utilized by the first application. The computing system may identify a plurality of monitoring interfaces associated with a monitoring interface application and configured to enable monitoring of a plurality of resources utilized by the first application. Each monitoring interface of the plurality of monitoring interfaces may be configured to determine at least one metric associated with a respective resource of the plurality of resources. The computing system may configure the monitoring application to utilize the plurality of monitoring interfaces to monitor the plurality of dependency nodes through at least one monitoring query associated with the monitoring interface application.

The computing system may automatically identify, by the monitoring application, a problem node of the plurality of dependency nodes through a tree traversal process. The tree traversal process may begin at a first layer of the dependency tree corresponding to the one or more immediate dependencies. The computing system may traverse the tree by first determining, based on the plurality of monitoring interfaces, an operating status of each dependency node included in a current layer of the dependency tree. Based on whether a given dependency node of the current layer is identified as having an unhealthy status, and based on whether each dependency node of the current layer is identified as having a healthy status, the tree traversal process may proceed. A given dependency node may be determined to have an unhealthy status based on whether one or more metrics associated with the corresponding dependency satisfy one or more operating status thresholds. When the given dependency node is identified as having an unhealthy status, the computing system may continue to traverse the dependency tree to identify the problem node by advancing to a next layer of the dependency tree, wherein the next layer of the dependency tree comprises nodes corresponding to a plurality of sub-dependencies of the dependency corresponding to the given dependency node. When each dependency node of the current layer is identified as having a healthy status, the computing system may identify a parent dependency node, of an immediately prior layer of the dependency tree, that has an unhealthy status as the problem node. The computing system may generate, by the monitoring application, a notification indicating that the parent dependency node is the problem node.

According to some embodiments, a computer-implemented method for configuring a monitoring application to monitor a plurality of dependencies of a monitored application using a set of monitoring interfaces is provided. The method may be performed by a monitoring device and/or other suitable computing devices. The monitoring device may determine a plurality of dependencies associated with a first application. The plurality of dependencies may comprise one or more immediate dependencies associated with the first application and one or more sub-dependencies associated with the first application. Each sub-dependency of the one or more sub-dependencies may correspond to a dependency of a respective immediate dependency or sub-dependency associated with the first application. The monitoring device may configure a monitoring application to monitor the plurality of dependencies using a plurality of monitoring interfaces. The plurality of dependencies may comprise a first dependency. For example, the first dependency may be an Application Programming Interface (API) associated with a resource utilized by the first application. As another example, the first dependency may be a platform utilized by the first application. And as a third example, the first dependency may be a network utilized by the first application to communicate with another dependency. Configuring the monitoring application to monitor the first dependency of the plurality of dependencies may include querying a monitoring interface application to determine a set of monitoring interfaces associated with the first dependency. Configuring the monitoring application may further include configuring the monitoring application to monitor the first dependency using one or more first monitoring interfaces of the set of monitoring interfaces. The monitoring device may monitor, by the monitoring application, an operating status of the first dependency. The monitoring device may determine the operating status of the first dependency based on determining one or more of: whether a resource associated with the given dependency is accessible; a response latency associated with requests to the given dependency; an error rate associated with requests to the given dependency; or an error state or error message provided by the given dependency. Determining the operating status of a given dependency is based on a predetermined time period prior to a current time. And the monitoring device may generate an alert, based on detecting that the operating status of the first dependency satisfies at least one unhealthy operating status threshold, that the first dependency has an unhealthy operating status.

In some implementations, configuring the monitoring application to monitor the first dependency further may include querying the monitoring interface application to determine the at least one unhealthy operating status threshold. The monitoring device may prompt a user to provide the at least one unhealthy operating status threshold. The monitoring device may generate a recommended value for the at least one unhealthy operating status threshold based on a machine learning model trained to identify correlations between the first dependency and the first application having an unhealthy operating status. The monitoring application may be configured to monitor the first dependency based on the determine unhealthy operating status thresholds.

In some implementations, the monitoring application may be configured to utilize the one or more first monitoring interfaces through at least one monitoring query associated with the monitoring interface application. The method may further comprise re-configuring the monitoring application to monitor the first dependency at a second time, after originally configuring the monitoring application to monitor the first dependency, by. The monitoring application may be reconfigured by querying the monitoring interface application to determine an updated set of monitoring interfaces associated with the first dependency at the second time; determining that at least one new monitoring interface is present in the updated set of monitoring interfaces; and configuring the monitoring application to monitor the first dependency using the at least one new monitoring interface. Similarly, the monitoring application may be reconfigured based on detected updates to the monitoring interface and/or removal of a monitoring interface.

Dependency Analyzer

According to some aspects discussed further herein, the monitoring device may implement dependency analysis features to automatically identify dependencies for a target application based on one or more sources of dependency information for the target application and its respective dependencies. Implementing a dependency analyzer may allow for automatic on-boarding and/or configuration of the monitoring application for a monitored application. Data lineage documentation, API call logs, and other resources may be parsed to determine dependencies of the monitored application. The system may map out the dependencies of the monitored application and build a logical dependency tree for use in identifying the root cause of performance issues. Updates to the dependencies of the application may be automatically detected and used to keep the monitoring application up to date. In particular, these features may be used to assist in determining dependencies of a target application for use in configuring a monitoring application, as described above with respect to FIG. 5.

Figure 7:
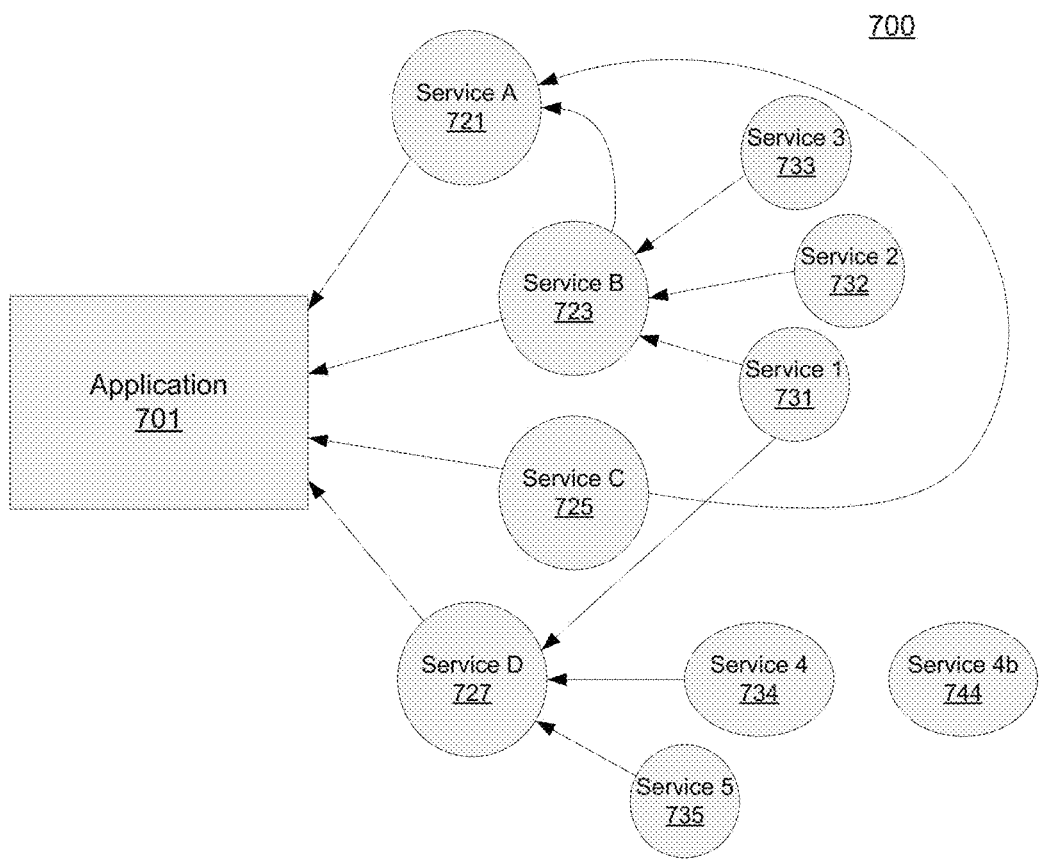
FIG. 7 depicts another example operating environment used to discuss illustrative aspects of systems and methods for building a dependency tree.

FIG. 7 depicts an example operating environment 700 used to discuss illustrative aspects of systems and methods for building a dependency tree. Example environment 700 may be similar to environment 200 of FIG. 2, and the elements illustrated therein may have similar features. Application 701 may be an application in a complex system that has multiple dependencies that it requires to process user requests and transactions. Although referred to as an "application," application 701 may be any suitable software application, platform, API, or other service that the user desires to monitor using the monitoring application.

In the example environment illustrated in FIG. 7, application 701 is illustrated as having four dependencies: Service A 721, Service B 723, Service C 725, and Service D 727. Application 701 may rely on information and/or actions provided by services A-D to process transactions, for example. Each may be referred to as an immediate, or direct, dependency of application 701. Each service relied on by application 701 may have its own further dependencies, which may be referred to as sub-dependencies of application 701. For example, in the illustrated example, Service A further depends on Service B and Service C. Service B further depends on Service 1 731, Service 2 732, and Service 3 733. Service C may not have any dependencies of its own. Service D depends on Service 1, Service 4 724, and Service 5 735. For example, application 701 may rely on Service B to provide account information for the user. Service B may rely on Service 1 for transactions associated with the account, Service 2 for balance information, and Service 3 for user address information. And application 701 may rely on Service D for determining a rewards status of the user. Service D may rely on Service 1 (which Service B also relies on) to obtains the transactions associated with the account.

Each service in environment 700 (and similarly in environment 200) may correspond to a particular data resource (more particularly, a data element). The data resource may be data that the service is responsible for handling, or may be data handled by a software application or platform associated with a microservice like an API. The data resource associated with a service may be the information that upstream applications or other services rely on the service to provide. For example, application 701 may rely on Service B to provide account information for the user. A data resource associated with Service B may be account records in an account database. Multiple data resources may be associated with a given service, and the data resources may be treated at varying levels of generality. For example, another data resource associated with Service B may be the account database. In some implementations, the data resources associated with a service may include a set of data resources that, if absent, may each cause the service to have an unhealthy operating status. Although discussed with respect to data resources, some embodiments may apply the described techniques with respect to specific data element values, pieces of information needed by the application and services to perform processing.

In an enterprise system, many different services may exist. Some complex systems may have hundreds of thousands of API microservices that enterprise applications can leverage to retrieve and operate on enterprise data. Some APIs in an enterprise system may provide access to the same data resource. For example, Service D as a rewards platform may rely on Service 4 to provide a rewards tier of the user. Another service, Service 4b 744 may also be provided by another platform on the enterprise system that also provides the rewards tier of the user. For example, Service 4b may be part of a travel platform that also maintains the rewards tier of the user. By recognizing that two services (e.g., Service 4 and Service 4b) provide the same data resource, a monitoring application can recommend corrective action to reconfigure a monitored application to retrieve a missing data resource from another service when a first service enters an unhealthy state, as discussed further herein.

Figure 8:
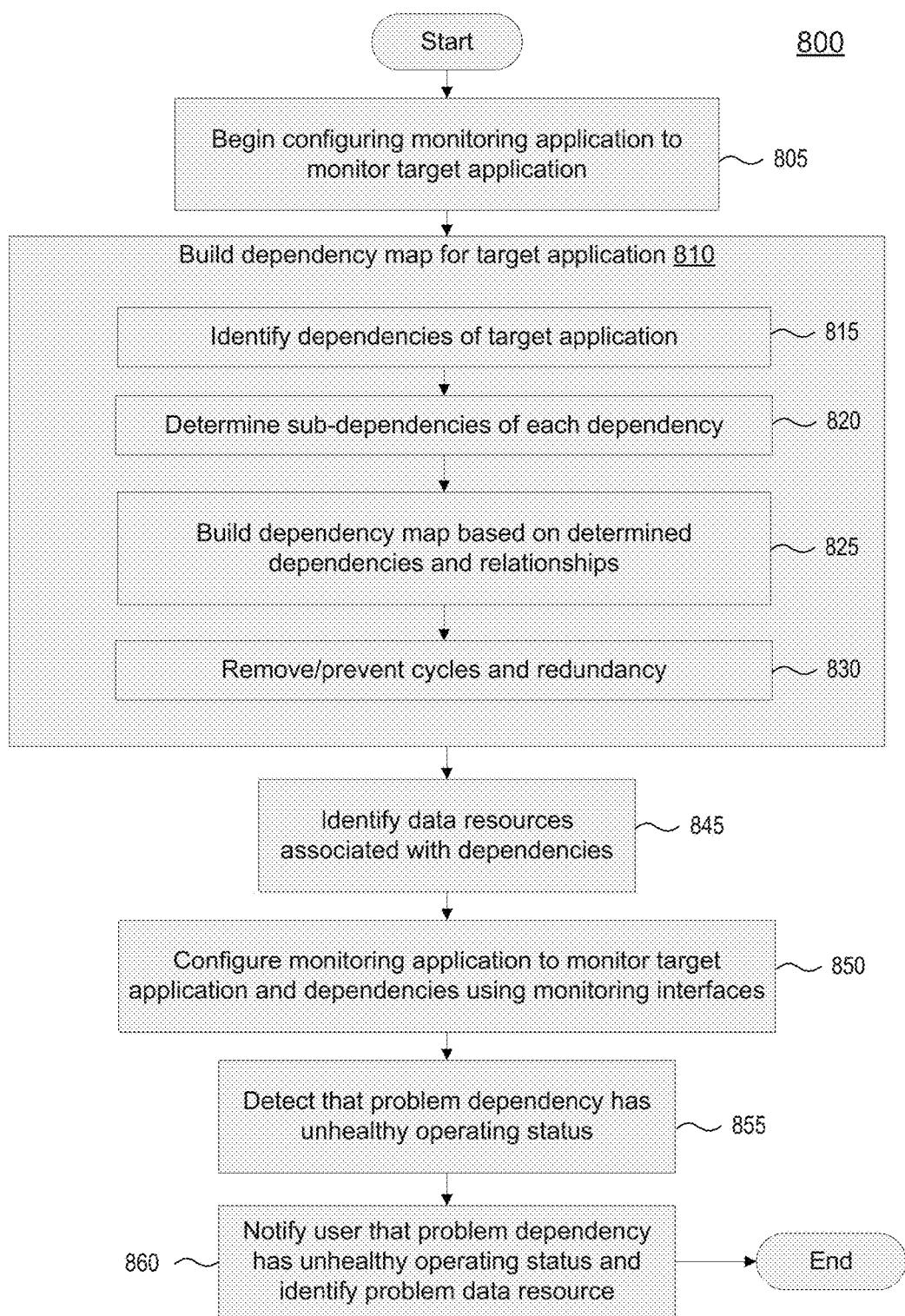
FIG. 8 depicts a flowchart illustrating an example method for building and using a dependency tree.
Figure 9A:
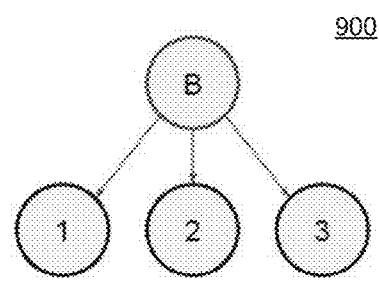
FIGS. 9A-9E depict illustrative stages of building a dependency tree for an example operating environment.
Figure 9B:
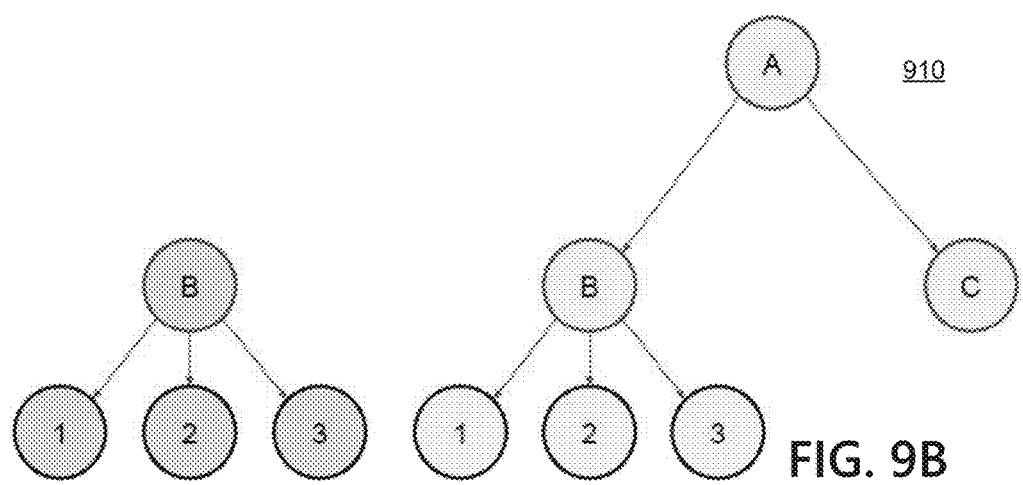
Figure 9C:
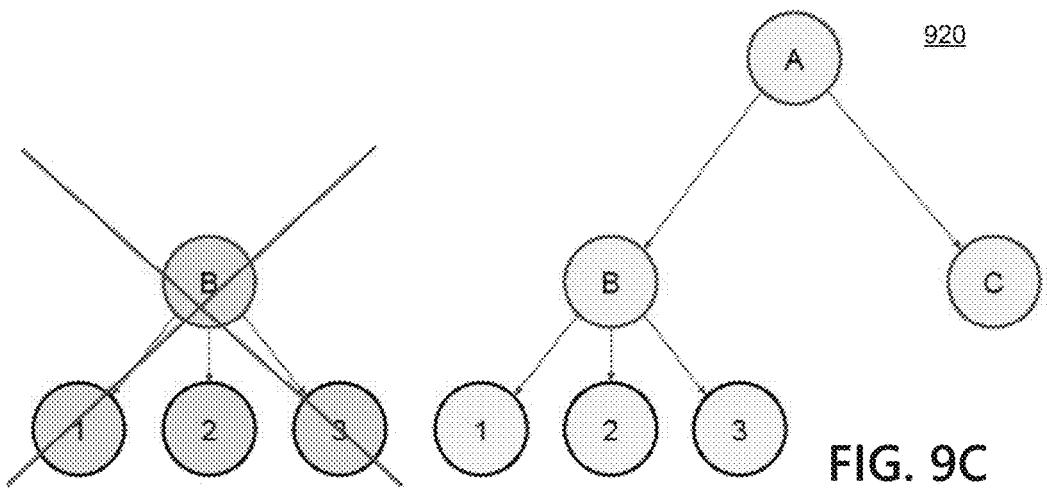
Figure 9D:
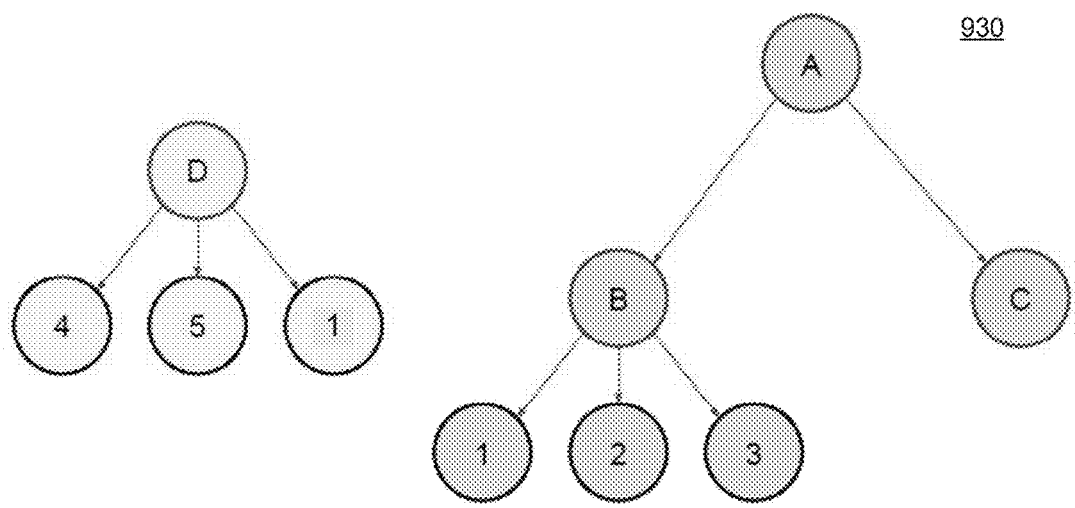
Figure 9E:
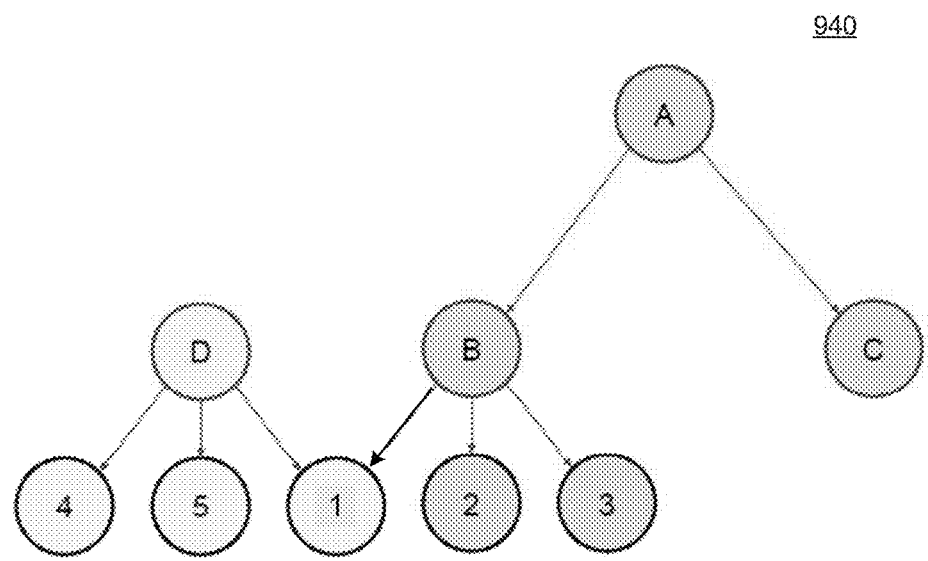

FIG. 8 depicts a flowchart illustrating an example method 800 for building a dependency map for a target application and notifying a user of a data resource associated with a problem dependency of the target application. Method 800 may be performed by any suitable computing device, such as a monitoring device, as was described above with respect to method 500.

At step 805, the monitoring device may begin configuring a monitoring application to monitor a target application. The monitoring application may be initially configured to identify the application and one or more operating metrics of the application itself, in accordance with aspects described herein. To configure the monitoring application to monitor dependencies of the target application, the monitoring application may need to determine dependencies of the target application (as in step 505 of FIG. 5).

At step 810, the monitoring device may build a dependency map for the target application. The dependency map may be a logical tree structure that tracks the application and its relationship with each of its dependencies. The dependency map may be structured as a tree to indicate how each service depends on another, and to model how the application ultimately depends on each service in the dependency map. Building the dependency map for the target application may be accomplished through steps 815-830.

At step 815, the monitoring device may identify dependencies of the target application. Dependencies of an application or other service may be determined using several techniques and sources of information. Data lineage documentation may list the dependencies of an application. Such data lineage documentation may have been generated by designers, developers, or administrators of the relevant system to track what services the application depends on. The dependency analyzer may leverage this existing documentation to determine dependencies of the application, when available. The dependency analyzer may, additionally and/or alternatively, use other techniques in determine dependencies of the application such as by analyzing API call logs associated with the application to determine which APIs are called by the application. As another example, the dependency analyzer may crawl monitoring interfaces associated with the target application to determine which possible dependencies the monitoring application is tracking to update an operating status of the application.

At step 820, the monitoring device may identify sub-dependencies of the target application, which may be further dependencies of the services that the target application relies on. As with determining the immediate dependencies of the application in step 815, dependencies of a service (that is a dependency of the target application) may be determined using several techniques and sources of information. Data lineage documentation may list the dependencies of that service. Such data lineage documentation may have been generated by designers, developers, or administrators of the relevant system to track what other services the service depends on. The dependency analyzer may leverage this existing documentation to determine dependencies of the service, when available. The dependency analyzer may, additionally and/or alternatively, use other techniques in determine dependencies of the service such as by analyzing API call logs associated with the service to determine which APIs it calls. The dependency analyzer may, for example, analyze API call logs to see the cascade of downstream API calls triggered by calls to a dependency of the service. Message IDs associated with the API call to the dependency may be used to correlate entries in the API call logs and determine which downstream calls correspond to the original API call. Based on determining that a downstream API gets called as a result of a call to a dependency, the monitoring device may determine that the downstream API is a further dependency of the service (and a sub-dependency of the application). As another example, the monitoring device may use patterns of failure determined by using machine learning models to process system event information, as explained further herein with respect to FIGS. 12-16, to infer dependency relationships among services. And chaos testing, such as through the API call interception techniques discussed further herein with respect to FIGS. 17-19, may be used to infer application and service dependencies based on determining a correlation between outage of a dependency service and outage of the application/service. Although illustrated as two steps 815 and 820, identifying the dependencies and sub-dependencies of the target application may be done as one step any of the techniques described above may be used to determine both immediate dependencies and further sub-dependencies.

At step 825, the monitoring device may build the dependency map based on the determined dependencies and sub-dependencies and the relationships between them. The monitoring device may build, as the dependency map, a dependency tree indicating the functional and/or logical relationship between the monitored application, its immediate dependencies, and further dependencies of those immediate dependencies. The dependency tree may be logically represented as a series of nodes, with each node corresponding to the application, an immediate dependency, or a further dependency.

Building the dependency tree for the target application may take into account and avoid redundant and/or circular dependencies as illustrated at step 830. The dependency mapping logic may consider whether a dependency is already present in the dependency tree, and may remove it from the tree and/or avoid adding the redundant dependency. The monitoring device may also be configured to avoid circular dependencies, detecting that a dependency structure would cause a loop in the dependency tree. The monitoring device may avoid adding the relationship that would complete the loop, avoiding complications of having a loop in the tree graph while still allowing each dependency to be traversed.

The dependency analyzer may build the tree according to a generalized algorithm, which may combine aspects of steps 825 and 830. The dependency analyzer may iterate over the identified dependencies for the target application. For a current service, the dependency analyzer may determine whether the current service already exists in the dependency map. If it does already exist, the current service will not need to be added to the dependency map again. If the current service is not in the dependency map, the dependency analyzer may get the data lineage for the current service. The current service and each of its dependencies may be added to a tree of the dependency map based on the data lineage for the current service. If any sub-trees in the existing tree, prior to adding the current service, are also included in the current service's data lineage, the dependency analyzer may remove the existing sub-trees and properly add them as part of the dependency tree of the current service. Operation of this algorithm on environment 700 of FIG. 7 is explained further below with respect to FIGS. 9A-E, which depict the state of the dependency map corresponding to application 701 as the tree is built by the dependency analyzer.

As an initial step in building the dependency tree corresponding to environment 700, the dependency analyzer may get a set of dependencies for application 701. A data lineage document, for example, may list the dependencies of application 701 as {Service B, Service A, Service C, Service D}. The dependency analyzer may iterate over the dependencies of application 701 to build a complete dependency map. First, the dependency analyzer may get the data lineage for Service B and add it to the dependency map, as shown in tree 900 of FIG. 9A. Second, the dependency analyzer may get the data lineage for Service A and add it to the dependency map, as shown in tree 910 of FIG. 9B. Third, the dependency analyzer may determine that the existing sub-tree for Service B is fully included in the data lineage for Service A, and may remove the existing sub-tree for Service B when adding the data lineage for Service A as shown in tree 920 of FIG. 9C. Fourth, the dependency analyzer may determine the data lineage for Service C, which has no dependencies, and see that the data lineage for Service C is already reflected in tree 920 of FIG. 9C because Service C is a dependency of Service A. Thus the dependency analyzer may skip re-adding Service C to the dependency map. Fifth, the dependency analyzer may get the data lineage for Service D and add it to the dependency map as in tree 930 of FIG. 9D. Sixth, in some implementations, because Service D and Service B both depend on Service 1, the dependency analyzer may eliminate further redundancy by updating the dependency map to have Service D and Service B depend on a same node corresponding to Service 1 as in tree 940 of FIG. 9E.

Returning to FIG. 8, at step 845, the monitoring device may identify data resources associated with the dependencies. As discussed above, each service may correspond to one or more data resources. The data resource may be data that the service is responsible for handling, or may be data handled by a software application or platform associated with a microservice like an API. The data resource associated with a service may be the information that upstream applications or other services rely on the service to provide. In some implementations, the data resources associated with a service may include a set of data resources that, if absent, may each cause the service to have an unhealthy operating status.

At step 850, the monitoring device may configure the monitoring application to monitor the target application and its dependencies using monitoring interfaces corresponding to the dependencies in the dependency map. At step 855, the monitoring device may determine a problem dependency that has an unhealthy operating status. Steps 850 and 855 may largely correspond to the similar steps and corresponding sub-steps discussed in FIG. 5.

At step 860, the monitoring device may notify a user that the problem dependency has an unhealthy status and may identify a likely problem data resource. The monitoring device may determine a data resource associated with the problem dependency and notify the user that the data resource may be the source of the performance problems. In some embodiments, the monitoring device may evaluate operating metrics and error messages associated with the problem dependency to determine whether the data resource is the likely cause of the problems. This evaluation may also help the monitoring device to generate a recommendation regarding which data resource of a set of data resources associated with the problem dependency are likely to have caused the problem. The notification may indicate an error message associated with the specific problem dependency. Surfacing the error message provided by the root cause of the problem may enhance the ability of an administrator to troubleshoot and correct unhealthy system performance.

The monitoring device may identify a likely problem data resource and surface that to the user via notifications. A system administrator may review the problem data resource and determine appropriate corrective action. For example, if the data resource is offline, the administrator may dispatch a technician to inspect hardware associated with the data resource. As another example, if the data resource has an unhealthy operating status, the administrator may send recovery commands to the data resource, such as through a command line interface or graphical user interface. Recovery commands may include acts such as restarting/rebooting the data resource and/or dependency, allocating additional resources to the data resource and/or dependency, adjusting one or more parameters associated with the data resource and/or dependency, and others. If the data resource is available elsewhere in the system, one corrective action may be to reconfigure the target application to retrieve the data resource from another service. This is described further below with reference to FIGS. 10 and 11.

Figure 10:
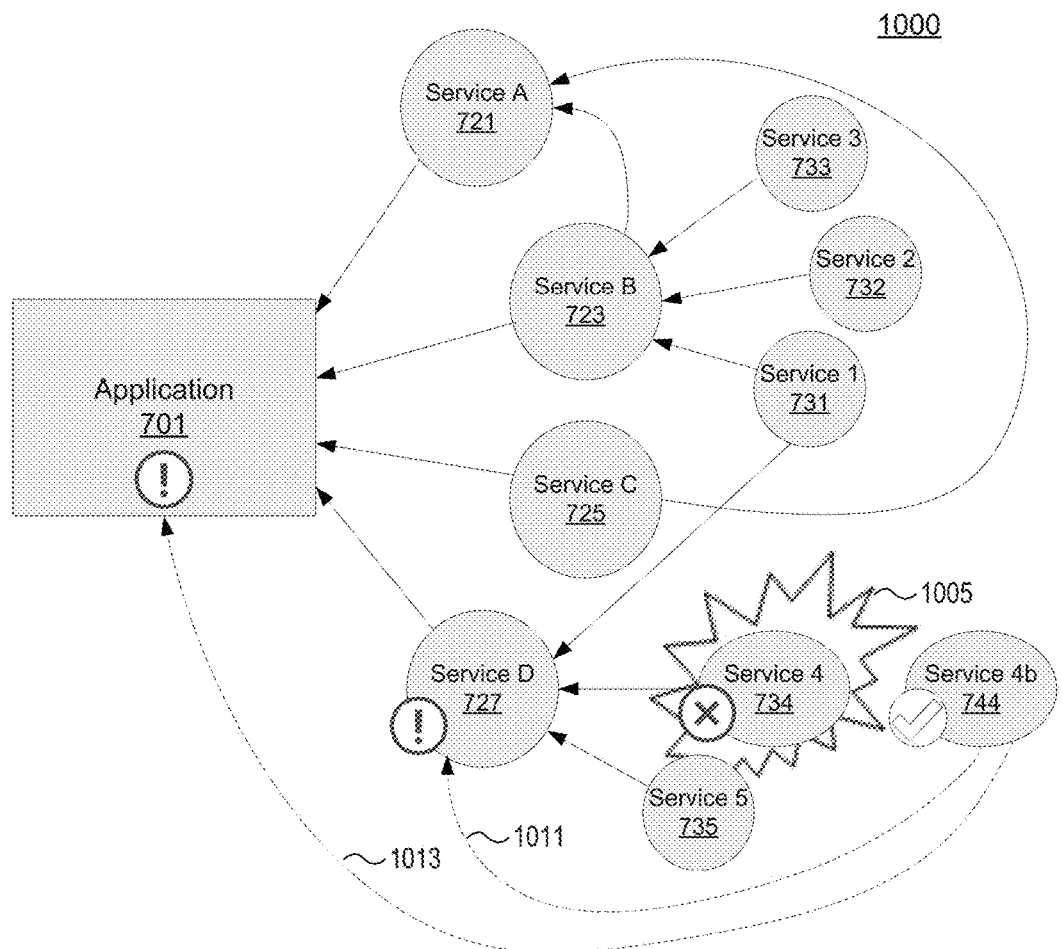
FIG. 10 depicts another example where a problem in the operating environment is causing the target application to behave in an unhealthy manner, according to one or more aspects of the disclosure.

FIG. 10 depicts another example environment 1000 where a problem 1005 is impacting performance of application 701, and causing application 701 to report an unhealthy operating status (perhaps healthy but for the failing dependency). Environment 1000 generally corresponds to environment 700, and the other elements are the same. Service 4 may be identified as the likely root cause of the performance issues stemming from problem 1005 using, e.g., method 500 of FIG. 5. For example, the system may see that Service D has an unhealthy operating status, but that Services A, B, and C are each healthy. The system may see that Service 4 is unhealthy while Service 5 is healthy. And the system may see that Service 4 is a last level service that has no dependencies of its own. Thus, the system may conclude that Service 4 is likely the root cause of the performance issues.

As discussed above with respect to FIG. 7 and environment 700, a data resource provided by Service 4 is also available from Service 4*b*. The monitoring device may determine that Service 4*b* has a healthy operating state, and may generate a recommendation that application 701 be reconfigured to get the data resource from Service 4*b* instead of failing Service 4 via path 1013. Similarly, the monitoring device may determine that Service D may be reconfigured to get the data resource from Service 4*b* instead of failing service 4 via path 1011. The monitoring device may include a suggestion regarding the reconfiguration of either the application 701 of Service D in a report. This is discussed further below with respect to FIG. 11.

Figure 11:
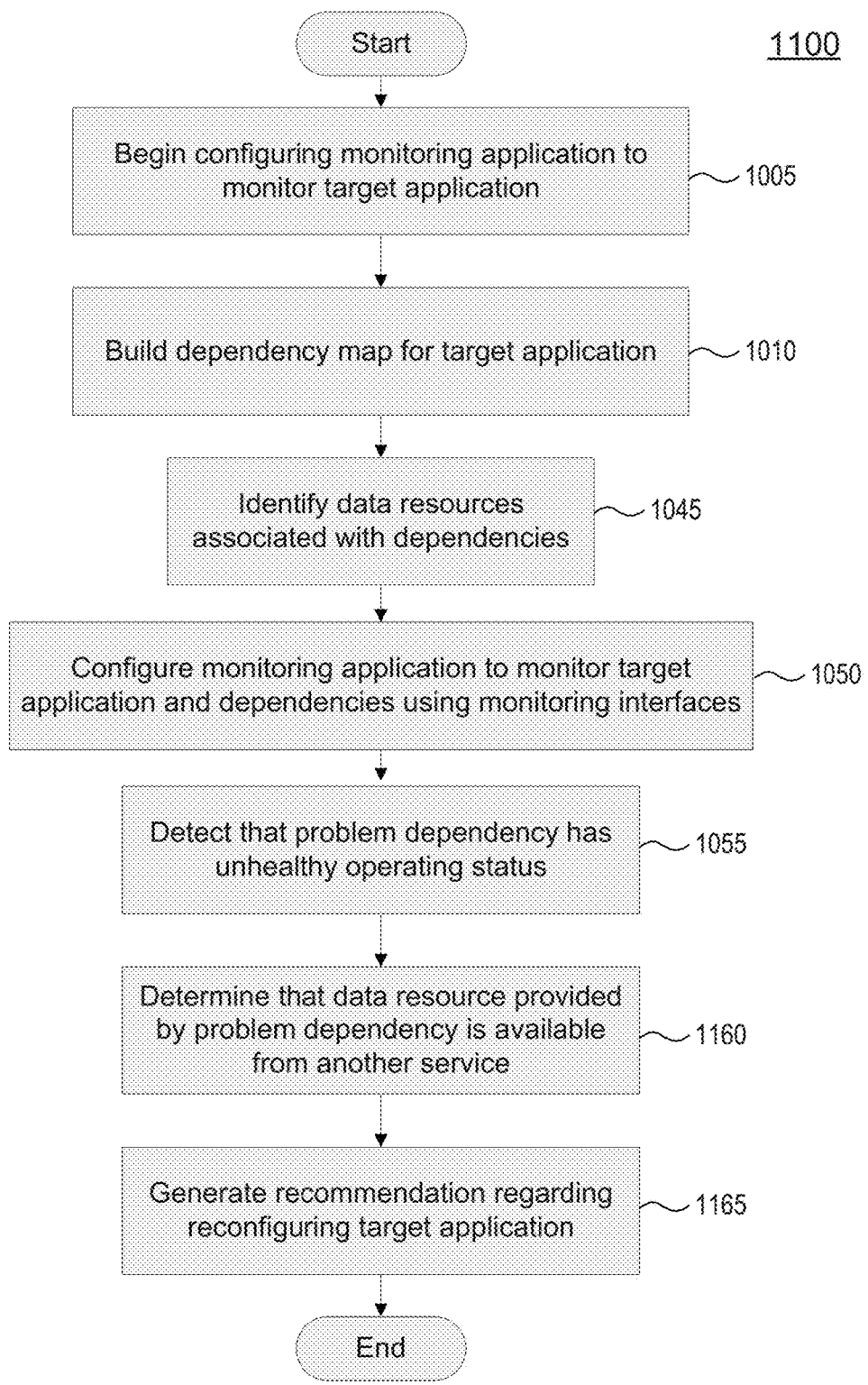
FIG. 11 depicts a flowcharts illustrating an example method for recommending corrective action.

FIG. 11 depicts a flowchart illustrating a method 1100 of generating a recommendation regarding reconfiguring a target application based on determining that a problem dependency has an unhealthy operating status. Method 1100 may proceed through steps 1005 through 1055 of FIG. 10. After the monitoring device detects that the problem dependency has an unhealthy operating status in step 1055, the monitoring device may proceed to determine a recommended corrective action.

At step 1160, the monitoring device may determine that the data resource provided by the problem dependency is available from another service. As explained above, in an enterprise system, many different services may exist. Some APIs in an enterprise system may provide access to the same data resource. By recognizing that two services (e.g., Service 4 and Service 4*b*) provide the same data resource, a monitoring application can recommend corrective action to reconfigure a monitored application to retrieve a missing data resource from another service when a first service enters an unhealthy state, as discussed further herein. According to some aspects, the other service need not provide the same identical data resource, and the monitoring device may be configured to allow for suitable, yet non-identical replacement.

At step 1165, the monitoring application may generate the recommendation regarding corrective action and provide it to the user. In some cases, the recommendation may prompt the user to take steps to reconfigure the application and/or dependencies. Additionally, and/or alternatively, the recommendation may be presented to the system administrator as a step the monitoring application can automatically implement once the administrator approves. In some cases and implementations, administrator approval may not be required and the monitoring device may proceed to automatically reroute requests destined for the problem dependency to the recommended replacement service. Recommendations may further include determining proposed system operations based on determining that the data resource is available from another service. Optimizations may seek to reduce the number of dependencies needed to obtain the data resource.

Thus, according to some aspects, a computer-implemented method for building a dependency map for an application or other service is provided. The method may be implemented by any suitable computing device, such as a monitoring device. The monitoring device may identify one or more first Application Programming Interfaces (APIs) that are dependencies of a first application. The monitoring device may determine one or more second APIs that are dependencies of each respective first API. The monitoring device may build the dependency map for the first application based on at least the one or more first APIs and the one or more second APIs. The monitoring device may identify data resources associated with each respective API in the dependency map. Using a monitoring interface providing one or more metrics regarding each dependency in the dependency map, the monitoring device may determine that a third API has an unhealthy operating status based on the one or more metrics satisfying one or more unhealthy operating status thresholds. The monitoring device may generate a notification, by the monitoring application, identifying a particular data resource provided by the third API and indicating that the unhealthy operating status of the third API is impacting performance of the first application. The monitoring device may determine, by the monitoring application, that the particular data resource is available from a fourth API. And the monitoring device may generate, by the monitoring application, a notification that the first application can be reconfigured to obtain the particular data resource from the fourth API and/or automatically reconfigure the first application to obtain the particular data resource from the fourth API.

In some implementations, the monitoring device may determine an error status message provided by the third API or the particular data resource. The notification identifying the particular data resource provided by the third API may include the error status message.

In some implementations, identifying the first and second APIs may be based on data lineage documentation associated with the first application and the first APIs. Determining the one or more second APIs may be based on an API call log associated with an API call made by the first application. The API call log may indicate a message ID of the API call made by the first application and comprises a record of each API involved in processing the API call. Identifying the one or more first APIs that are dependencies of the first application may additionally and/or alternative be based on determining APIs that are associated with a first plurality of monitoring interfaces configured to monitor the first application. Determining the one or more second APIs that are dependencies of each respective first API may be based on determining APIs that are associated with respective second pluralities of monitoring interfaces configured to monitor the respective first APIs. Identifying the one or more first APIs or determining the one or more second APIs may be based on a pattern of performance indicating that the first application relies on a service of a given API, wherein the pattern of performance is determined using a machine learning model trained based on clustering system status information associated with past events where the first application had an unhealthy operating status. And identifying the one or more first APIs or determining the one or more second APIs may be based on causing a given API to simulate an unhealthy operating status. The monitoring device may determine that the first application develops an unhealthy operating status based on the simulated unhealthy operating status of the given API.

In some implementations, building the dependency map for the first application may include adding the one or more first APIs to the dependency map as dependencies of the first application; adding the one or more second APIs to the dependency map as dependencies of a corresponding first API; and adding one or more other APIs to the dependency map as further dependencies of the one or more second APIs. Adding the one or more second APIs or one or more other APIs may include determining, for a fourth API of the one or more second APIs or one or more other APIs, that a same API is already present in the dependency map and omitting the fourth API from the dependency map based on the same API being present in the dependency map.

In some implementations, the monitoring device may automatically configure the monitoring application to utilize a plurality of monitoring interfaces configured to report one or more metrics corresponding to the one or more second APIs based on determining the one or more second APIs that are dependencies of each respective first API.

Intelligent Services

According to some aspects, the monitoring device may utilize machine learning techniques to determine patterns of performance based on system state information associated with performance events. System state information for an event may be collected and used to train a machine learning model based on determining correlations between attributes of dependencies and the monitored application entering an unhealthy state. During later, similar events, the machine learning model may be used to generate a recommended action based on past corrective actions. The monitoring application may also use information about baseline (and/or waterline) performance and unhealthy performance events to generate a health report using the trained model, indicating to a user information such as a predicted likelihood that the monitored application will enter an unhealthy operating state. This may allow the system to proactively provide users with information about and predict potential conditions that may cause the monitored application to become unhealthy. It may also allow the system to reactively generate recommended actions to restore the monitored application to a healthy state.

When a monitoring application determines that an application and/or one of its dependencies has an unhealthy operating status, such as in the manner discussed above with respect to FIG. 6, the monitoring device may record a system snapshot associated with the unhealthy operating status. The monitoring device may collect system snapshots at other times, including during normal operation, at times prior to when the unhealthy operating status occurs, and subsequent to recovery of the system and a return to healthy operating status. Armed with data about these different conditions of the system (e.g., what it looked like when things were good, what it looked like just before an unhealthy event, what it looked like during the unhealthy event, and what it looked like just after recovery from the unhealthy event), a machine learning model may be trained to make recommendations based on a current state of the system regarding the likelihood that a monitored application will enter an unhealthy operating state. The machine learning model may be trained to recognize emergent patterns of failure (and more generally, patterns of performance) based on clustering system attribute information to detect correlations between attributes of a dependency and the application entering an unhealthy operating state.

Figure 12:
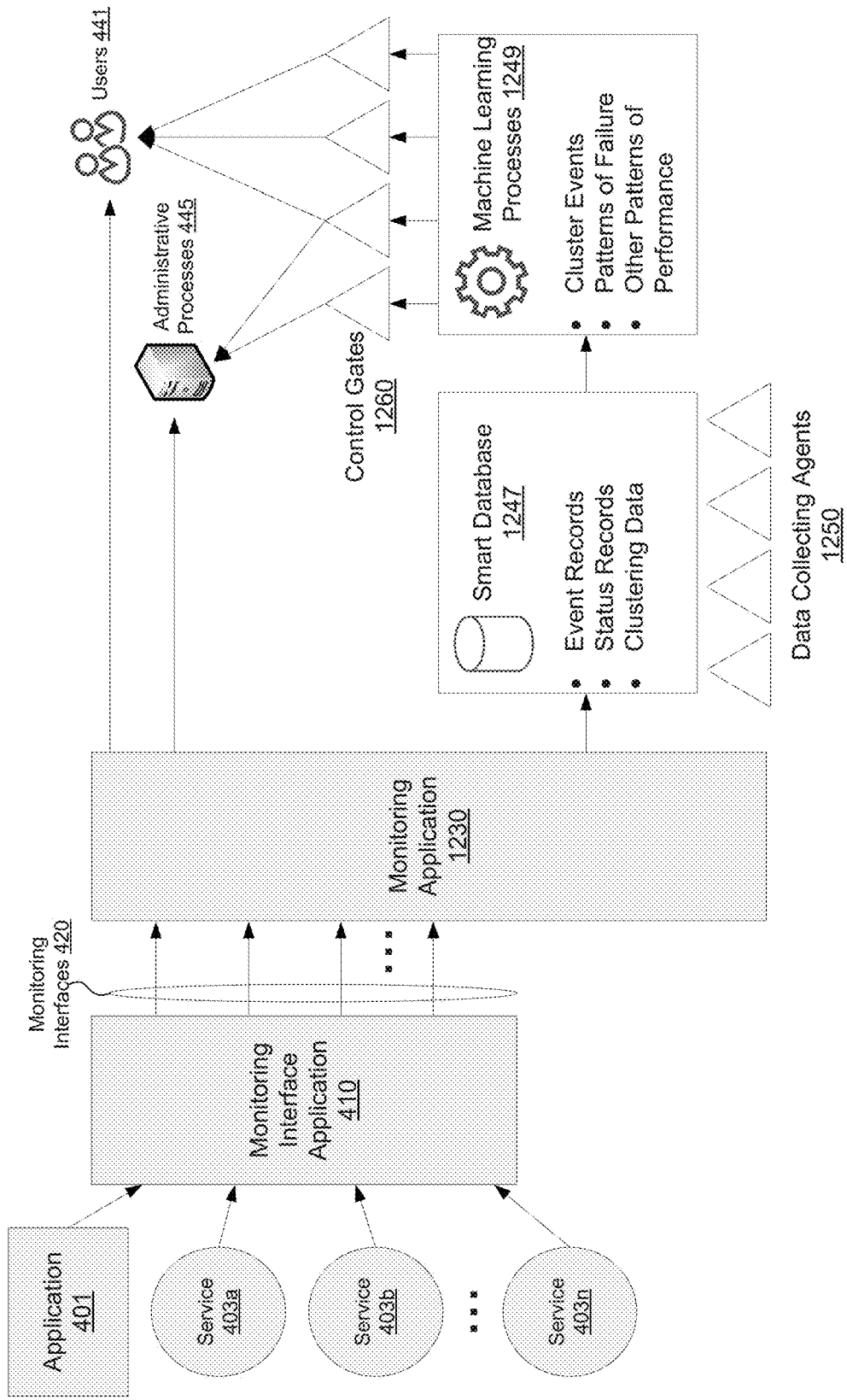
FIG. 12 depicts an example architecture for using machine learning processes in conjunction with a monitoring application, according to one or more aspects of the disclosure.

FIG. 12 depicts an example architecture 1200 for using machine learning processes in conjunction with a monitoring application 1230, according to one or more aspects of the disclosure. Architecture 1200 may be similar to architecture 400 of FIG. 4, and like numbered elements of FIG. 12 may correspond to the same or similar elements in FIG. 4.

Monitoring application 1230 may correspond to monitoring application 430 of FIG. 4, but is illustrated with additional details of the smart database and machine learning aspects. Monitoring application 1230 may be configured to utilize monitoring interfaces 420 to monitor the status of application 401 and its dependencies, services 403*a-n*. Monitoring application 1230 may interface with intelligent services components including smart database 1247 and machine learning processes 1249 to enable use of artificial intelligence and/or machine learning techniques to generate predictions regarding system operating status and corrective actions.

When monitoring application 1230 detects that the monitored application, or one of its dependencies, has an unhealthy operating status, monitoring application 1230 may store event record data in smart database 1247. The event record may comprise an indication of the application or other service having the unhealthy operating status, and may comprise one or more metrics obtained via monitoring interfaces 420. For example, an event record associated with the monitored application or other service having an unhealthy operating status may include operating metrics such as: number of transactions received per second, number of transactions handled per second, error rate, latency, network utilization, network speed, memory utilization, processor utilization, other resource utilization, latencies to individual dependencies, error rates of individual dependencies, error messages of an application or service, error messages of a dependency, and/or any other suitable operating metrics.

Event records in smart database 1247 may also comprise information corresponding to a snapshot of the system at the time of the event. Data collecting agents 1250 may operate to dump system state information regarding system status into an event record at the time of the event. For example, a data collecting agent may dump the contents of a messaging queue associated with the monitored application into the event record. Any suitable data about the system environment surrounding the application at the time of the performance event may be collected by data collecting agents 1250. Collected data may relate to hardware status, virtual infrastructure status, cloud resource status, CPU or other processor status, memory available and/or utilization, security structures and identified risks, traffic parameters including latency and/or call volume, runtime stack and/or other attributes of the runtime environment, JAVA stack, variable values, memory allocations, and the like.

The event records and other system information stored in smart database 1247 may be used by machine learning process 1249 to train a machine learning model and determine potential patterns of performance for the monitored application. A pattern of performance may indicate a correlation between an attribute of a dependency and the performance of the monitored application. Machine learning processes 1249 may consider different types of patterns of performance, including patterns of failure, patterns of latency, patterns of risk, and other suitable patterns of performance.

A first type of pattern of performance assessed by the machine learning processes 1249 may be a pattern of failure. A pattern of failure may indicate a potential correlation between an attribute of the system state information and the monitored application entering the unhealthy operating state. For example, the system may determine that when latency associated with calls to an accounts API increases above 100 ms, the monitored application is likely to enter an unhealthy operating state.

Another type of pattern of performance assessed by the machine learning processes 1249 may be a pattern of risk. A pattern of risk may indicate a potential correlation between an attribute of the system state information and a level of security risk to the monitored application and/or system. For example, the system may determine that recent updates to an authentication framework in the system results in an increased security risk of unauthorized access to the system.

And another type of pattern of performance assessed by the machine learning processes 1249 may be a pattern of latency. A pattern of latency may indicate a potential correlation between an attribute of the system state information and a latency associated with requests to the monitored application. For example, when a number of requests per second associated with a dependency of the monitored application goes up, latency associated with requests to the monitored application may increase.

Machine learning processes 1249 may determine these and other patterns of performance by clustering event records stored in smart database 1247. By applying clustering algorithms to the various system state information elements across a set of event records, the machine learning processes may determine emergent trends. Clustering may group similar events and determine common conditions associated with those events. The self-optimizing action of the clustering techniques may enable the machine learning processes to develop and train a model that can identify the patterns of failure and other patterns of performance By detecting the common conditions associated with a class of events, the machine learning processes may learn to recognize live conditions that indicate that the monitored application may be likely to enter an unhealthy operating state. Clustering may determine that an event captured in an event record is similar to one or more other events, and may organize the event records into groupings by generated event types.

Monitoring application 1230 may also store corrective actions associated with an event in smart database 1247. For example, when monitoring application 1230 detects that a monitored application or other service has an unhealthy operating state, the data collecting agents may dump system state information into smart database 1247. Monitoring application 1230 may further track corrective actions taken by a system administrator, and may store indications of the corrective action in smart database 1247 as well in association with the event records. Thus, machine learning processes 1249 may also learn from the corrective actions associated with the event records and generate a recommendation that similar corrective action be taken when similar conditions arise at a later time.

Machine learning processes 1249 may be trained on a set of event records collected over time by monitoring when any of the APIs enter an unhealthy state, collecting system state information each time in smart database 1247. The machine learning processes 1249 may group the event records and determine multiple event types based on clustering the event records. As an example, consider a system with four monitored applications each comprising an API (APIs #1, #2, #3, and #4). A high traffic event type A, in this example, may cause API #1 to suffer latency problems, and the corrective action may be to failover traffic to a backup server. An unhealthy instance event type B may cause APIs #1, 2, 3, and 4 each to fail. Corrective action for event type B may involve failover to the backup server, but also a rollback of changes made somewhere in the environment. An event type C may be any event that affects API #2 and API #4 due to a common dependency. Restoration action for event type C may be to rollback a recent change and also deploy more CPU resources to the common dependency. And an event type D may be an extension of event type C where there is also a high traffic event, where restoration action may require even more CPU resources.

Machine learning processes 1249 may train a machine learning model based on the event records to identify types of events and associated patterns of performance. Once the model is trained on these patterns of performance, a current operating status of the monitored application and system may be used by the machine learning processes to generate predictions regarding the likelihood that the system will enter an unhealthy state. If the system is in an unhealthy state, or if conditions seem ripe for the system to enter an unhealthy state, the machine learning processes 1249 may generate a recommended action to restore the system to a healthy state.

Recommended actions may take the form of control gates 1260. The trained machine learning model may be used to generate a recommendation regarding corrective action to be taken based on a current operating status and corrective action that was taken in past, similar events. Gates may comprise a recommended corrective action, and may be manual, automatic, and/or hybrid in nature. For example, a first gate may correspond to a notification prompting users 441 to roll back a recent change that correlates with an increased security risk. Another gate may correspond to an automatic gate that instructs administrative processes 445 to automatically deploy extra resources to a dependency that is experiencing increased traffic. And an example hybrid gate may comprise both an automatic component and a manual component, such as an automatic step to reroute traffic to a backup server and a user notification prompting the user to reboot the main server. Automatic actions may be limited to a "do no harm" philosophy, with low impact actions like adding more resources or acting in an 100% confidence setting handled automatically, while corrective action that may have user impacts, higher costs, or security risks may be handled through manual gates.

Smart database 1247 may also store non-event, status records that capture normal operation of the monitored application and its dependencies. Status records may capture the picture of the system at a given time, and may be used by the machine learning process 1249 on their own and/or in conjunction with the event records. For example, machine learning processes 1249 may use the status records associated with a healthy operating status of the monitored application to determine a baseline performance expectation for the monitored application. Knowing the baseline may enable the machine learning processes to better identify anomalous attributes in event records that may contribute to the monitored application having and unhealthy operating status. And the baseline may be relevant to generating a system health report, allowing the machine learning processes to generate a prediction regarding the likelihood that individual applications and other services may enter an unhealthy operating state.

Aspects of the intelligent services features discussed herein, making use of smart database 1247 and machine learning processes 1249, may build a model that recognizes conditions that lead to system problems. Current status information obtained by continuous monitoring using monitoring application 430/1230, as discussed throughout this document, may be fed into the trained model to determine whether the system is likely to enter an unhealthy operating state and generate recommendations for corrective actions. When the monitoring device detects an event that the trained machine learning model predicts may lead to unhealthy operation for the monitored application and/or system, the monitoring device may provide a recommended action through the manual, automatic, and hybrid gates discussed above. Corrective actions recommended may include spinning up a new node, assigning additional resources to a problem dependency, failover bypass to other services, communication with other system administrators, reboot, rollbacks, and any other suitable corrective action to address problems affecting the performance of the monitored application and/or system.

Figure 13:
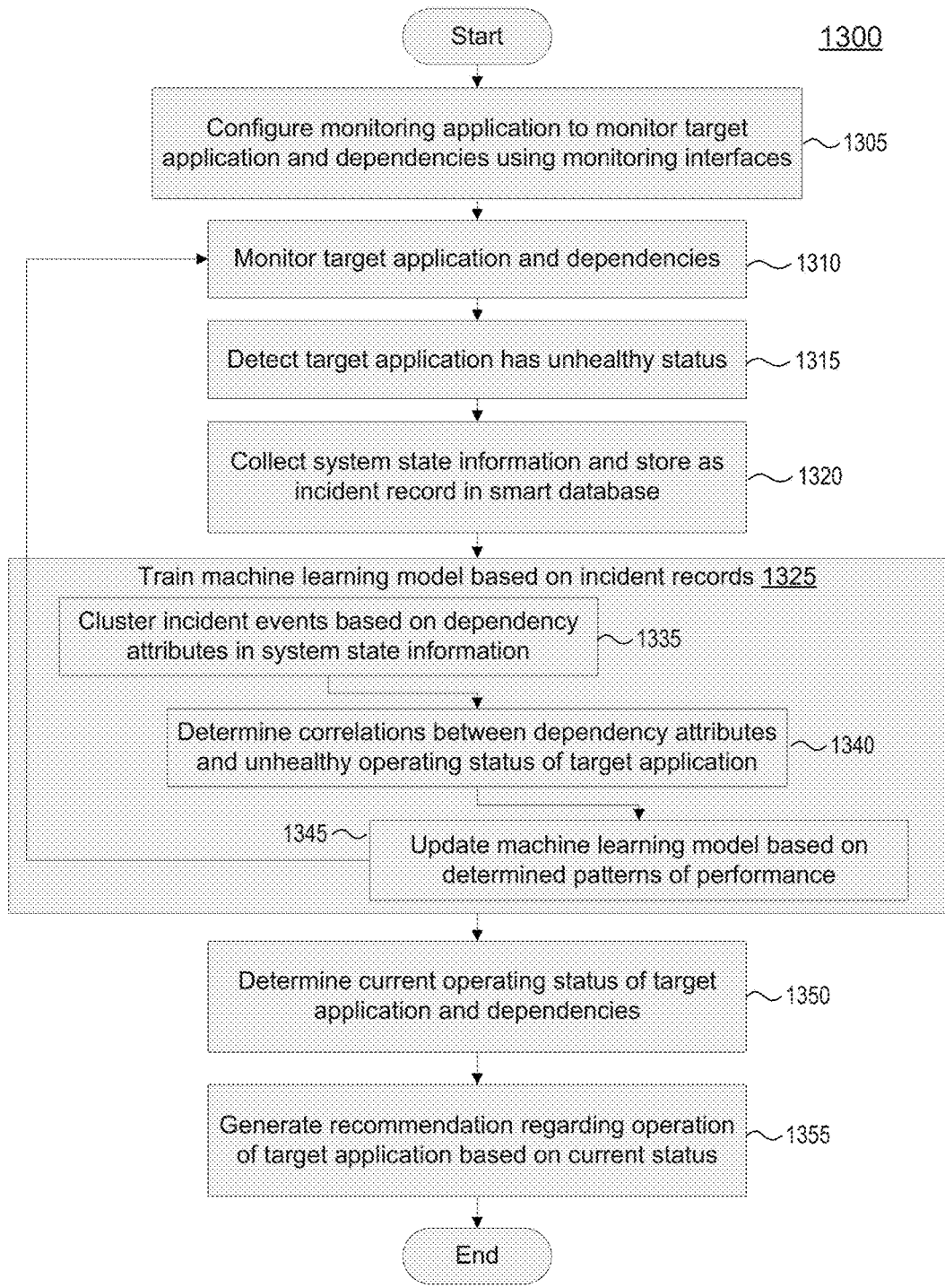
FIGS. 13 and 14 depict flowcharts illustrating example methods for applying intelligent services using the monitoring application, according to one or more aspects of the disclosure.

FIG. 13 depicts a flowchart illustrating an example method 1300 for generating a recommendation regarding operation of a target, monitored application based on a current operating status. Method 1300 may be performed on any suitable computing device, in similar fashion to that discussed above for method 500 of FIG. 5. For example, method 1300 may be performed on a monitoring device implementing monitoring application 1230, smart database 1247, and machine learning processes 1249 of FIG. 12.

At step 1305, the monitoring device may configure the monitoring application to monitor a target application and its dependencies using one or more monitoring interfaces. At step 1310, the monitoring device may monitor the status of the target application and dependencies. And at step 1315, the monitoring device may detect that the target application has an unhealthy operating status. Steps 1305-1315 may correspond generally to the steps illustrated in FIG. 5.

At step 1320, the monitoring device may collect system state information and store it as an incident/event record in a smart database. For example, data collecting agents (such as data collecting agents 1250) may gather and dump system state information to provide a snapshot of the system state of the time that the monitored application has an unhealthy operating status. The collected system state information for the event record may include information corresponding to the various dependencies of the monitored application, including attributes of the respective dependencies.

At step 1325, the monitoring device may train a machine learning model based on a set of incident records. Once multiple event records are stored in the smart database, the machine learning processes may cluster the events and determine emergent trends and patterns of performance for use in generating predictions regarding operation of the monitored application.

At step 1335, the monitoring device may train the machine learning model by clustering incident events based on attributes in the system status information associated with each event record. In particular, incident events associated with the monitored application may be clustered based on attributes of the dependencies of the monitored application. In performing the clustering, the monitoring device may group the different incident events based on commonalities, such as a scope and nature of service impact, the types and identity of services impacted, the state of dependencies of the monitored application, corrective action taken, and the like.

At step 1340, the monitoring device may determine correlations between attributes of the dependencies of the monitored application and the unhealthy operating status of the monitored application. For example, when a first dependency of the monitored application has a high latency attribute, the monitored application may show a pattern of performance by also suffering from high latency. Correlations between attributes of dependencies (and/or system state information) and the operating status of the monitored application may be learned by the machine learning model as patterns of performance.

Patterns of performance may be determined based on any suitable element of system status information, or combinations thereof. For example, in clustering the event records the monitoring device may determine a pattern of performance associated with a time of day. In an example, a particular service may be determined to have a high likelihood of breaking every day at a particular time, such as a navigation service during rush hour. As another example, seasonality may be taken into account and determined to support a pattern of performance. In an example, an ecommerce platform may be more likely to fail during the holiday shopping season than during the rest of the year. Clustering and training the machine learning model may be able to uncover these emergent patterns of performance through recognizing common attributes among different event records.

At step 1345, the monitoring device may update the machine learning model based on the determined patterns of performance. The monitoring device may resume monitoring the target application and its dependencies, continuing to train the model further based on additional incident events.

At step 1350, the monitoring device may determine a current operating status of the monitored application and its dependencies. As discussed previously with respect to FIGS. 5 and 6, the monitoring device may use one or more monitoring interfaces configured to obtain operational metrics associated with performance of the monitored application and its dependencies.

At step 1355, the monitoring device may use the trained machine learning model to generate a recommendation regarding operation of the monitored application based on the current system status. For example, the trained machine learning model may enable the monitoring device to recognize that certain conditions at a first dependency are associated with a pattern of failure that the monitoring application has a 20% chance of entering an unhealthy operating status. Based on this pattern of failure, the machine learning processes may generate a recommendation that the user take corrective action to address the issues before they cause the monitored application to enter the unhealthy operating status.

The determined patterns of performance may also be useful in improving the configuration of the monitoring application. For example, the determined patterns of performance may be used to infer dependency relationships. If an unhealthy state of a monitored application is well-correlated with outage of another resource, it may be inferred that the monitored application may depend on that resource (or at least that they are interdependent). Similarly, the patterns of performance may be useful in determining which operating metrics may be most relevant to monitoring system health. For example, if latency issues are correlated with a high likelihood of failure, while high volume events only have a slightly increased change of failure, then the pattern of performance may be used to recommend that the monitoring application be configured to track monitoring interfaces providing latency metrics for the monitored application and dependencies.

Figure 14:
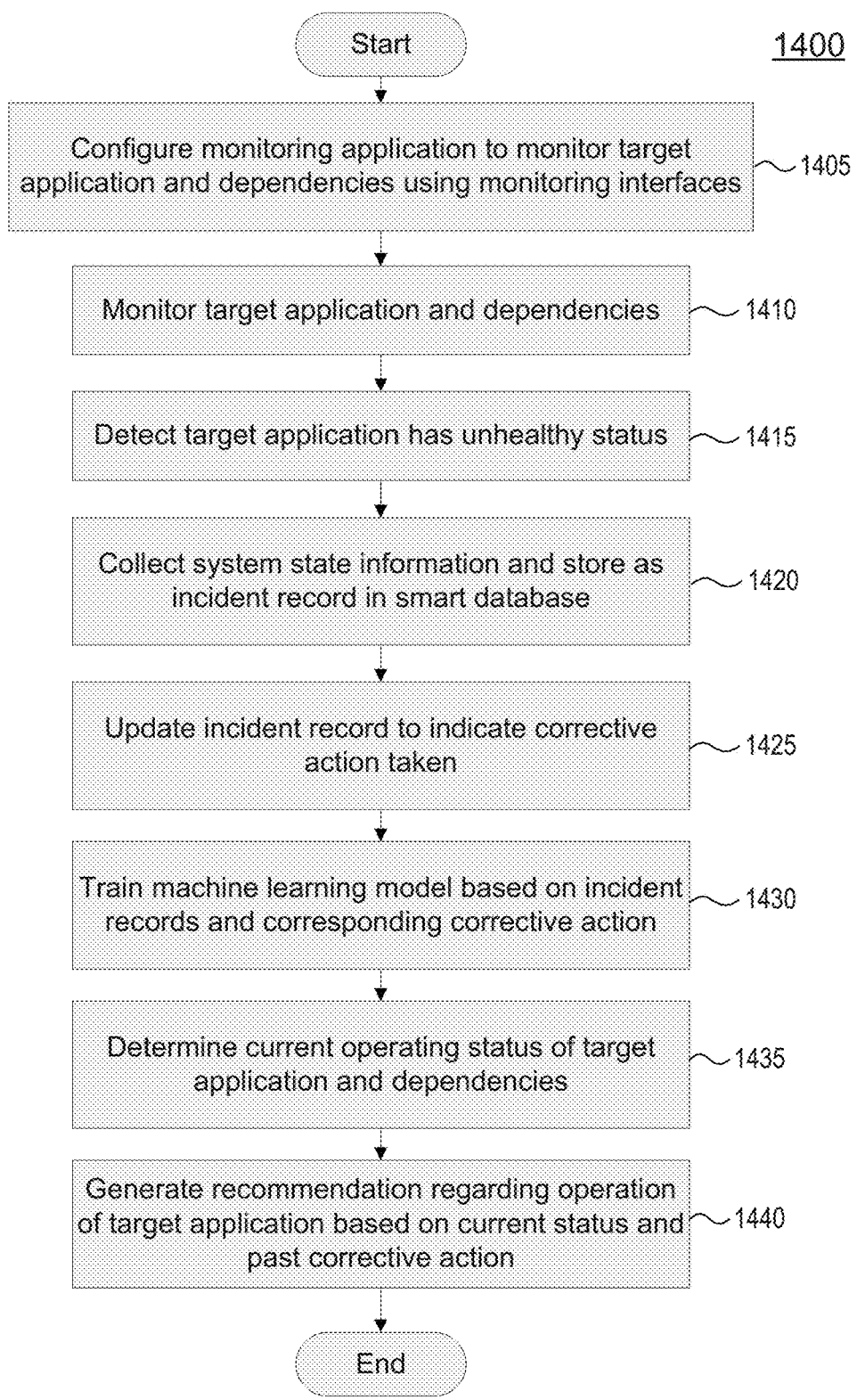

FIG. 14 depicts a flowchart illustrating an example method 1400 for generating a recommendation regarding operation of a target, monitored application based on a current operating status and past corrective action. Method 1400 may be performed on any suitable computing device, in similar fashion to that discussed above for method 500 of FIG. 5. For example, method 1400 may be performed on a monitoring device implementing monitoring application 1230, smart database 1247, and machine learning processes 1249 of FIG. 12.

At steps 1405, the monitoring device may configure the monitoring application to monitor a target application and its dependencies using one or more monitoring interfaces. At step 1410, the monitoring device may monitor the status of the target application and dependencies. And at step 1415, the monitoring device may detect that the target application has an unhealthy operating status. Steps 1405-1415 may correspond generally to the steps illustrated in FIG. 5.

At step 1420, the monitoring device may collect system state information and store it as an incident/event record in a smart database, in the same manner as described for step 1320 of FIG. 13. For example, data collecting agents (such as data collecting agents 1250) may gather and dump system state information to provide a snapshot of the system state of the time that the monitored application has an unhealthy operating status. The collected system state information for the event record may include information corresponding to the various dependencies of the monitored application, including attributes of the respective dependencies.

At step 1425, the monitoring device may update the incident/event record to indicate corrective action taken by a system administrator. The monitoring device may detect that the system administrator took certain corrective action in response to the unhealthy operating status of the monitored application or other service, and may add this corrective action in association with the event record. The corrective action may become associated with the cluster of events that corresponds to the event detected in step 1415. The monitoring device may detect the corrective action based on a notification regarding the corrective action, such as through the administrator reporting the corrective action to the monitoring device. Additionally, and/or alternatively, the monitoring device may detect the corrective action through continuous monitoring, detecting that a change to one or more attributes of the monitored application, its dependencies, or other element in the system after detection of the unhealthy status event.

At step 1430, the monitoring device may train a machine learning model based on a set of incident records and the corresponding corrective actions. Once multiple event records are stored in the smart database, the machine learning processes may cluster the events and determine emergent trends and patterns of performance for use in generating predictions regarding operation of the monitored application. Step 1430 may correspond to steps 1325, 1335, 1340, and 1345 of FIG. 13, though with the addition that the clustering and training is further based on the corrective action. The monitoring device may observe many different changes after detecting the unhealthy operating status event, and may record each as system status information associated with resolution of the unhealthy operating status event. Through clustering, the monitoring device may identify which changes are effective to remediate particular problems, and may recommend similar action in future unhealthy operating status events. Thus, the monitoring device may observe many candidates for suitable corrective action, but based on correlating changes made across similar events may be able to determine corrective action that may address the issues underlying the unhealthy operating status event.

At step 1435, the monitoring device may determine a current operating status of the target application and its dependencies. As discussed above, operating status information for the target application and its dependencies may be obtained by the monitoring application via one or more monitoring interfaces configured to report operational metrics associated with the monitored application and/or dependencies.

At step 1440, the monitoring device may generate a recommendation regarding operation of the target application based on the current status of the target application and its dependencies, and further based on the past corrective application. The monitoring device may determine that the current status of the monitored application and/or other services fall within a pattern of performance recognized by the trained machine learning model. Based on determining that the current status aligns with a determined pattern of performance, the monitoring device may generate a recommendation for corrective action to take to avoid the monitored application entering an unhealthy operating status and/or restore normal operation.

The intelligent services features may also evaluate a current operating state of the monitored application and its dependencies to determine overall system health relative to a baseline/waterline. Continuous monitoring of the monitored application and its dependencies may allow the monitoring application to present users with a health report for the system on request at a given time. Visualizations may be constructed to better convey the state of the monitored application, its dependencies, and the broader system. Performing such a waterline analysis may be beneficial in allowing system administrators to quickly evaluate an overall system health and take preemptive action as appropriate. It may also allow system administrators to answer questions such as "what is a good time to push out a big software update with minimal user impact." Aspects described herein may account for interdependency between a monitored application and other services based on the learned patterns of performance, and may make attendant predictions regarding system health based on the interdependency. If an interdependency is failing, then the risk of additional elements failing rises. According to some aspects, a monitoring application can evaluate and score these risks using the intelligent services discussed herein. These aspects are discussed further herein with respect to FIGS. 15 and 16.

Figure 15:
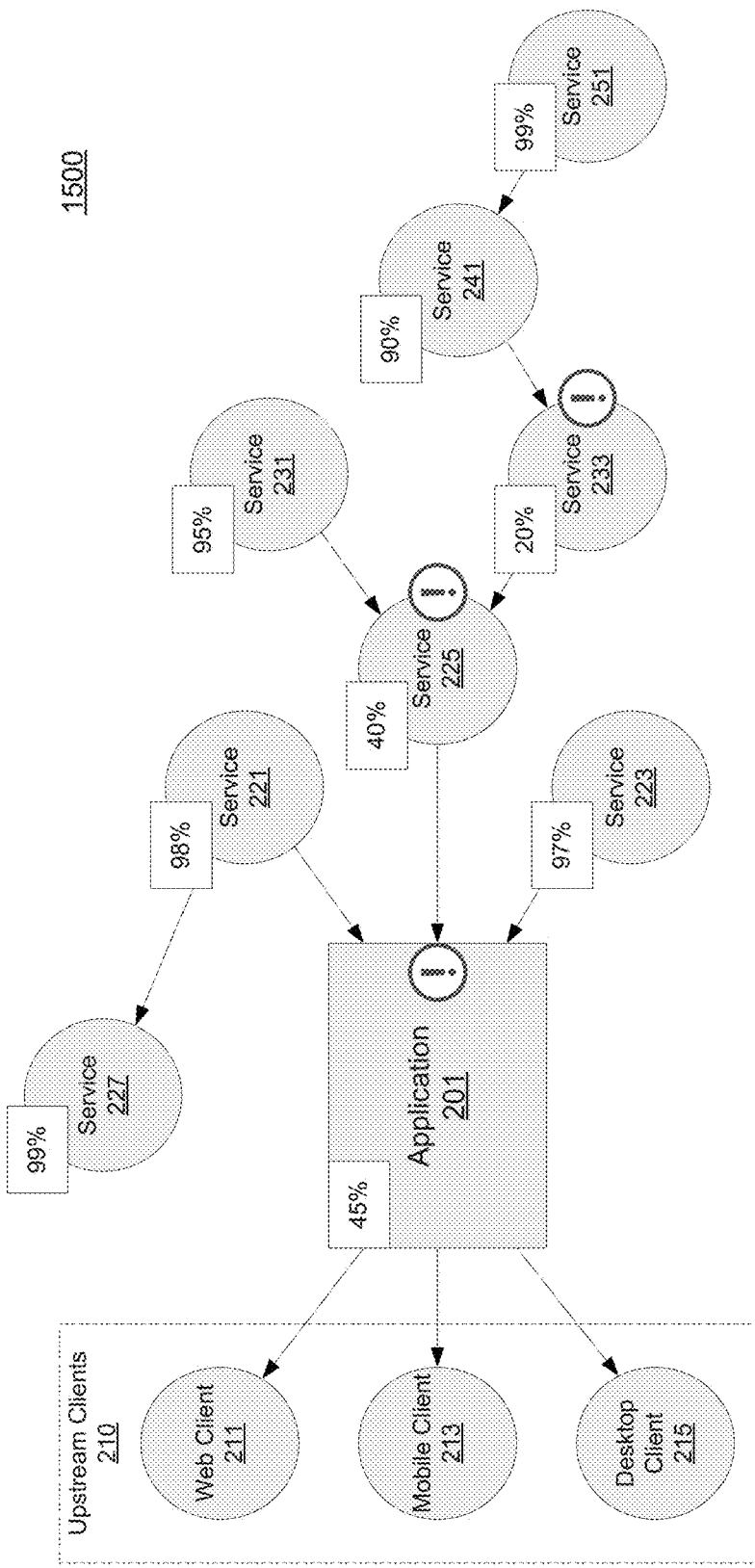
FIGS. 15 and 16 depict an example operating environment and method for providing a baseline recommendation using intelligent services, according to one or more aspects of the disclosure.

FIG. 15 depicts a visualization 1500 corresponding to operating environment 200 of FIG. 2. Visualization 1500 may provide a health report indicating operating metrics and predictions regarding the status of the monitored application 201 and/or its dependencies. As illustrated in FIG. 15, the visualization or health report may indicate a percent health of each element in the system. For example, application 201 is displayed as having 45% health, which may be based on the machine learning processes predicting that there is a higher than usual chance that application 201 will enter an unhealthy state. Much like parsing the dependency tree as discussed above with respect to FIGS. 5 and 6, the monitoring device may parse the tree to determine a predicted operating health for each of the monitored application and its dependencies. Continuing the illustrated example, services 221, 223, and 227 appear to have normal operation. But service 225 is being impacted by downstream failures, and may have a low health of 40% —indicating that there is an increased likelihood that service 225 will enter an unhealthy operating state. Further, service 233 may be experiencing partial outages. Monitoring device may be aware of the issues at service 233 through observing the monitoring interfaces associated with service 233 during on-boarding of the monitoring application. Yet service 241 may not be reporting any issues, and that visualization 1500 illustrates service 241 as having a 90% health.

Other operating metrics may be displayed through visualization 1500 as well (not illustrated). For example, visualization 1500 may be configured to display latency requests per second, processor utilization, and/or any other suitable metric. Visualization 1500 may include display elements configured to communicate to a user a likely severity of each issue included in visualization 1500. For example, if the trained machine learning model includes a pattern of failure associated with dependency latency values above 100 ms, then visualization 1500 may use colors or other visual elements to indicate the predicted severity of the identified issues.

Severity and predicted health may be determined by the machine learning model based on evaluating a current status against baseline operation of the monitored application and its dependencies. Moreover, the lines between the nodes may be used to represent another measurable variable representative of the "load" between two linked nodes (not illustrated). Load may be traffic, criticality, and/or any other suitable metric. Choice of values to represent on the visualization using the lines may depend on whether the nodes have an upstream relationship to the monitored application (where traffic load may be used) or a downstream relationship (where criticality of the dependency may be used). Like the nodes themselves, the connector lines themselves may have probabilistic scores as determined by the trained machine learning model.

Example factors that may increase risk of unhealthy performance in an enterprise system may include: changes within the interdependent systems, events within the interdependent systems, traffic events, frequency of usage, brokenness of system, brokenness of interdependent systems. Factors that may mitigate increased risk may include: relative weights of the importance of various services, ability to look aside for redundant access to necessary data resources, caching allowing increased resiliency to temporary outages.

The intelligent services aspects described herein may operate to visualize the system status during a variety of loads and other settings. A baseline visualization and system health report may be generated based on normal operating status under typical loads, for example. A waterline visualization and system healthy report may be based on operating statuses measured during a high load event. Visualizing the baseline/waterline for the system, monitored application, and its dependencies may provide system administrators with a more complete source of information to make decisions regarding performance, security, and maintenance. Knowing what the system looks like at a baseline, normal state of operations may facilitate better identification of when the system is in an abnormal or unhealthy state of operation. Knowing what the waterline, high water mark for the system looks like, e.g., what the system operating status looks like under a high load, may facilitate management of the system in such a high load scenario. For example, if a waterline report indicates that high loads may cause a key dependency of the monitored application to fail, an administrator and/or the machine learning processes may determine to provide additional resources to the key dependency to avoid problems.

The baseline and waterline visualizations and reports may facilitate optimization of the system. An administrator and/or the machine learning processes may compare the baseline and waterline scenarios to determine what the system looks like in a typical scenario versus in a higher-risk state. The administrator and/or machine learning processes may recommend and/or implement optimizations based on mitigating potential problems associated with the demands of the higher-risk state of the system. By viewing the state of the system in a waterline report, administrators and/or machine learning processes may identify that an attribute is correlated with high risk of failure to the system, and may implement suitable corrective actions. Thus, the visualization of the baseline, waterline, and anywhere in between may provide actionable intelligence allowing proactive steps to improve system performance and reliability.

Figure 16:
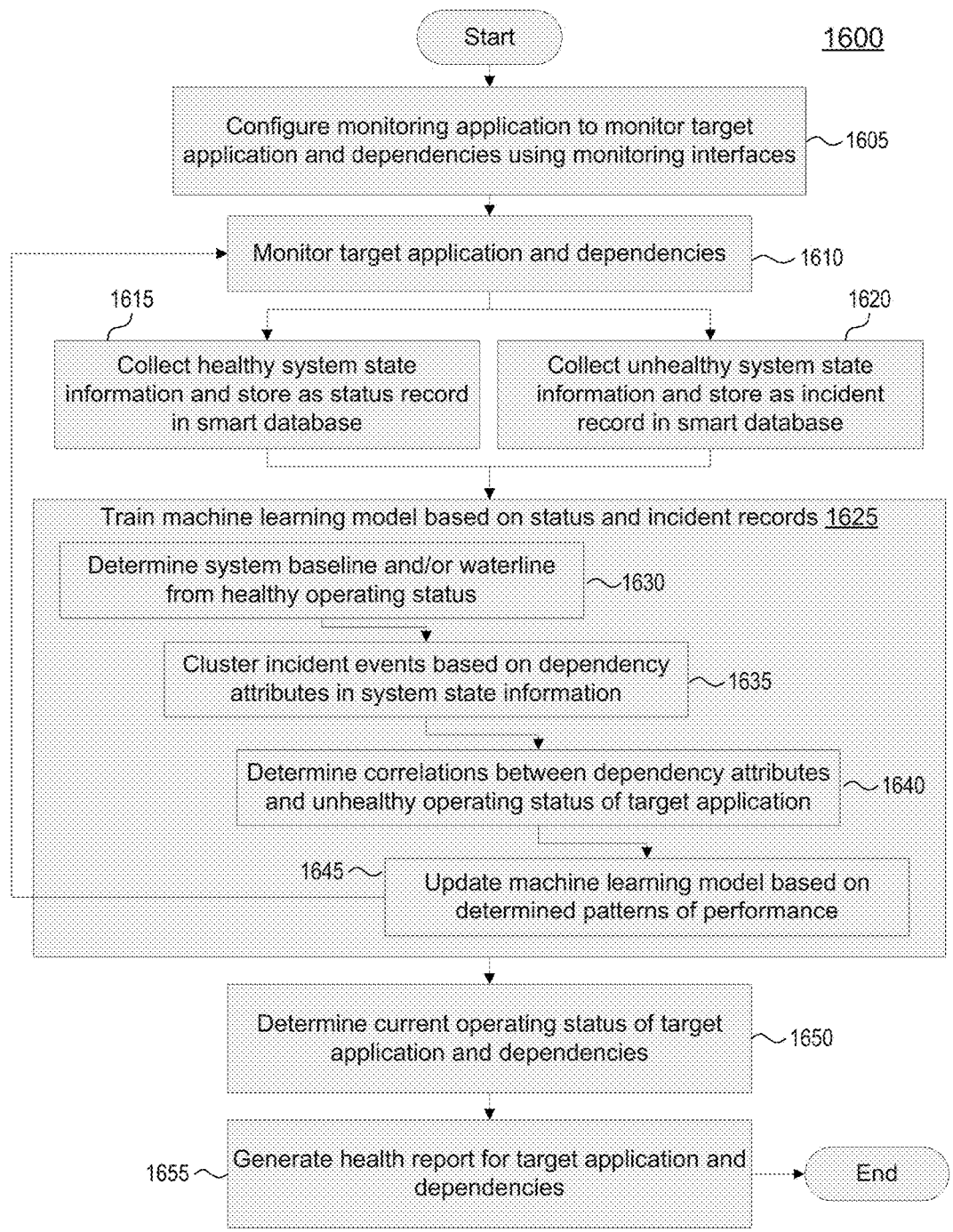

FIG. 16 depicts a flowchart illustrating an example method 1600 for generating a health report for a target, monitored application based on a current operating status. Information about baseline and/or waterline performance of the system may inform the generation of the health report. Method 1600 may be performed on any suitable computing device, in similar fashion to that discussed above for method 500 of FIG. 5. For example, method 1600 may be performed on a monitoring device implementing monitoring application 1230, smart database 1247, and machine learning processes 1249 of FIG. 12.

At step 1605, the monitoring device may configure the monitoring application to monitor a target application and its dependencies using one or more monitoring interfaces. At step 1610, the monitoring device may monitor the status of the target application and dependencies. Steps 1605 and 1610 may correspond generally to the steps illustrated in FIG. 5.

At step 1615, the monitoring device may collect system state information associated with normal, healthy operation of the system and store it as a status record in a smart database. For example, data collecting agents (such as data collecting agents 1250) may gather and dump system state information to provide a snapshot of the system state at periodic times. The collected system state information for the event record may include information corresponding to the various dependencies of the monitored application, including attributes of the respective dependencies. In the illustrated method steps, method 1600 may use healthy system state information to determine a baseline against which unhealthy system state information is compared. But, as discussed above, the monitoring device may also collect system state information associated with a high load operation of the system and determine a waterline state of the system. The waterline state of the system may also be used by the machine learning processes to determine potential problems present when the monitored application enters an unhealthy operating state.

At step 1620, the monitoring device may collect system state information associated with an unhealthy operating status of the monitored application and store it as an incident/event record in the smart database. For example, data collecting agents (such as data collecting agents 1250) may gather and dump system state information to provide a snapshot of the system state of the time that the monitored application has an unhealthy operating status.

At step 1625, the monitoring device may train a machine learning model based on a combination of status and incident records. Once multiple event records are stored in the smart database, the machine learning processes may cluster the events and determine emergent trends and patterns of performance for use in generating predictions regarding operation of the monitored application. The patterns of performance may be further based on comparing system status information associated with an unhealthy operating status of the monitored application in the incident records against system status information associated with a healthy and/or high load operating status of the monitored application in the status records.

At step 1630, the monitoring device may determine a system baseline and/or waterline representation based on the system status information in the status records corresponding to the monitored application having the healthy (and/or high load) operating status. The conditions present in the system during a healthy operating status may be used to inform the determination of patterns of failure (or other patterns of performance) from incident event records.

At step 1635, the monitoring application may train the machine learning model by clustering incident events based on attributes in the system status information associated with each event record. In particular, incident events associated with the monitored application may be clustered based on attributes of the dependencies of the monitored application. In performing the clustering, the monitoring device may group the different incident events based on commonalities, such as a scope and nature of service impact, the types and identity of services impacted, the state of dependencies of the monitored application, corrective action taken, and the like. Clustering in step 1635 may further be informed based on the baseline and/or waterline representations of the system.

At step 1640, the monitoring device may determine correlations between attributes of the dependencies of the monitored application and the unhealthy operating status of the monitored application. For example, when a first dependency of the monitored application has a high latency attribute, the monitored application may show a pattern of performance by also suffering from high latency. Correlations between attributes of dependencies (and/or system state information) and the operating status of the monitored application may be learned by the machine learning model as patterns of performance. The machine learning processes may utilize the baseline and/or waterline representations of the system to better determine correlations between attributes of the dependencies and the unhealthy status of the monitored application. For example, the baseline and/or waterline representations may indicate an acceptable range of latencies at the dependencies that do not typically lead to the monitored application entering the unhealthy state. The machine learning processes may use this information to avoid determining an improper correlation between latencies in that range and the unhealthy status of the application, and may evaluate other potential correlations. As with method 1300 of FIG. 13, clustering and training the machine learning model may be able to uncover emergent patterns of performance through recognizing common attributes among different event records.

At step 1645, the monitoring device may update the machine learning model based on the determined patterns of performance. The monitoring device may resume monitoring the target application and its dependencies, continuing to train the model further based on additional incident events.

At step 1650, the monitoring device may determine a current operating status of the monitored application and its dependencies. As discussed previously with respect to FIGS. 5 and 6, the monitoring device may use one or more monitoring interfaces configured to obtain operational metrics associated with performance of the monitored application and its dependencies.

At step 1655, the monitoring device may use the trained machine learning model to generate a health report for the target application and dependencies. The health report may comprise a visualization of the monitored application and its dependencies. The health report may include one or more metrics regarding health of the system. For example, the health report may indicate a response latency associated with dependencies in the system. As another example, the monitoring device may determine a health score or other value indicating an overall health of a system component. The health score may represent a likelihood that the system will stay in a healthy operating status and/or a likelihood that the system will enter an unhealthy operating status. For example, a health score of 90% may indicate that the current conditions at a dependency are at 90% health, and there is a 10% chance that the current conditions may lead to the monitored application entering an unhealthy operating state within a given time period. The machine learning processes may generate the health scores based on comparing the current operating status of the system to the determined patterns of performance Current attributes that are correlated with potential patterns of failure may be assigned a lower health score. The health scores may also be determined relative to the baseline and/or waterline scenarios. A system health score may be presented relative to the baseline, such as where the indicated health score corresponds to the likelihood that current attributes of a dependency may cause the monitored application to enter an unhealthy state above (or sometimes below) the baseline risk. recommendation regarding operation of the monitored application based on the current system status. For example, the trained machine learning model may enable the monitoring device to recognize that certain conditions at a first dependency are associated with a pattern of failure that the monitoring application has a 20% chance of entering an unhealthy operating status. Based on this pattern of failure, the health report may indicate that the first dependency is likely to cause the monitored application to enter the unhealthy operating status. The health report may use one or more visual cues to flag the health score for the first dependency as a high risk that may require attention.

The health reports, and the machine learning models trained by method 1600, may enable administrators and/or machine learning processes to identify critical dependencies that are strongly correlated to unhealthy system performance. The model may be used to assess which critical dependencies may cause a cascade of errors and bring the monitored application down. By identifying critical dependencies, the monitoring device may enable administrators and/or machine learning processes to take proactive actions to address the most critical dependencies. For example, if a dependency is highly correlated with failure of the system, an administrator and/or machine learning process may configure the system to provide additional resources to the critical dependency. Identifying the keystones that can cause the whole system to break may improve the overall healthy and resiliency of the enterprise system and monitored application.

Health reports may also enable an administrator and/or machine learning process to make decisions about when to perform system updates or releases. The trained machine learning model may be used to predict health scores based on current conditions, and the update or release may be planned for a period when the system has a good health score to minimize the impact to users and the likelihood of causing the system to enter an unhealthy operating state.

Thus, according to some aspects, a computer-implemented method for generating predictions regarding system health may be provided. The method may be performed by any suitable computing device, such as a monitoring device. The monitoring device may configure a monitoring application to monitor a first application and a plurality of dependencies of the first application using a plurality of monitoring interfaces. The monitoring device may detect, by the monitoring application and based on the plurality of monitoring interfaces, that the first application has an unhealthy operating status. The first application may be determined to have an unhealthy status based on whether one or more metrics associated with the first application satisfy one or more operating status thresholds. One or more data collecting agents may collect, based on detecting that the first application has the unhealthy operating status, system state information corresponding to the first application and each of the plurality of dependencies. The monitoring device may store the collected system state information in a database as a first incident record corresponding to a first incident event and comprising incident attribute information for the first application and each of the plurality of dependencies. Collected incident attribute information corresponding to the first dependency may comprises information indicating one or more of: whether a resource associated with the first dependency is accessible; a response latency associated with requests to the first dependency; an error rate associated with requests to the first dependency; or an error state or error message provided by the first dependency. In some implementations, the first incident record may include timing information associated with the first incident event. Determining the first pattern of performance may be based on the timing information associated with the first incident event and timing information associated with other incident events.

The monitoring device may train a machine learning model based on a plurality of incident records including the first incident record. Training the machine learning model may comprise clustering incident events corresponding to each of the plurality of incident records for the first application. Clustering the incident events may be based on attributes of the system state information corresponding to each of the plurality of dependencies. The monitoring device may further train the machine learning model by determining one or more patterns of performance based on the clustered incident events. A first pattern of performance of the one or more patterns of performance may indicate a potential correlation between a first attribute of the system state information corresponding to a first dependency and the first application having the unhealthy operating status. The monitoring device may update the machine learning model based on the determined patterns of performance. In some implementations, the first dependency may correspond to an Application Programming Interface (API) associated with a resource utilized by the first application. In some implementations, the first dependency may correspond to a network utilized by the first application to communicate with another dependency.

The monitoring device may detect, by the monitoring application and based on the plurality of monitoring interfaces, a current operating status of the first application and the plurality of dependencies. Using the trained machine learning model, the monitoring device may generate, based on the first pattern of performance and the current operating status, a recommendation regarding operation of the first application or the first dependency. Generating the recommendation regarding the operation of the first application or the first dependency may comprise determining, using the machine learning model, a suggested action based on incident records corresponding to the first pattern of performance. The suggested action may be, e.g., bypassing the first dependency. The first incident record may further comprise information indicating a corrective action taken in response to the first incident event. Determining the suggested action based on incident records corresponding to the first pattern of performance may comprise determining, using the machine learning model, the suggested action based on the corrective action taken in response to the first incident event. The recommendation may comprise a notification regarding the suggested application. Additionally, and/or alternatively, the recommendation may comprise automatically implementing, by the monitoring application, the suggested action. A hybrid approach may be taken, where generating the recommendation regarding the operation of the first application or the first dependency comprises generating a user notification regarding a first portion of the suggested action and automatically implementing, by the monitoring application, a second portion of the suggested action.

According to some aspects, the first pattern of performance may be a pattern of failure and may indicate a potential correlation between the first attribute of the system state information corresponding to the first dependency and the first application entering the unhealthy operating status. According to other aspects, the first pattern of performance may be a pattern of risk and may indicate a potential correlation between the first attribute of the system state information corresponding to the first dependency and a level of security risk to the first application. And according to still other aspects, the first pattern of performance may be a pattern of latency and may indicate a potential correlation between the first attribute of the system state information corresponding to the first dependency and a latency associated with requests to the first application.

According to other aspects, a computer-implemented method for providing a report of current system healthy may be provided. The method may be implemented by any suitable computing device, including a monitoring device. The monitoring device may configure a monitoring application to monitor a first application and a plurality of dependencies of the first application using a plurality of monitoring interface. The monitoring device may collect, by one or more data collecting agents and at a first time, first system state information corresponding to the first application and each of the plurality of dependencies. The first application may have a healthy status at the first time. The monitoring device may detect, by the monitoring application and based on the plurality of monitoring interfaces, that the first application has an unhealthy operating status at a second time. The monitoring device may collect, by the one or more data collecting agents and based on detecting that the first application has the unhealthy operating status, second system state information corresponding to the first application and each of the plurality of dependencies. The collected first system state information and second system state information may be stored in a database as a first status record and a second status record, respectively.

The monitoring device may train a machine learning model based on a plurality of status records, including the records from the healthy, first time and the records from the unhealthy, second time. Training the machine learning model may comprise clustering incident events corresponding to status records associated with the first application having an unhealthy status. Clustering the incident events may be based on attributes of system state information, of a corresponding status record, corresponding to each of the plurality of dependencies. The monitoring device may determine one or more patterns of performance based on the clustered incident events and the first system state information. A first pattern of performance of the one or more patterns of performance may indicate a potential correlation between a first attribute of the system state information corresponding to a first dependency and the first application having the unhealthy operating status. Training may further involve updating the machine learning model based on the determined patterns of performance Using the trained model, the monitoring device may generate, based on the first pattern of performance, a health report for the first application and the plurality of dependencies. The health report may indicate a likelihood that the first application will enter an unhealthy status. The health report may indicate at least one metric associated with the first dependency. The health report may comprise a visualization of the plurality of dependencies. The health report may indicate a likelihood that a current condition of the first dependency will cause the first application to enter an unhealthy state.

In some implementations, the monitoring device may detect, by the monitoring application and based on the plurality of monitoring interfaces, a current operating status of the first application and the plurality of dependencies. Generating the health report for the first application and the plurality of dependencies may be further based on the current operating status of the first application and the plurality of dependencies.

In some implementations, the monitoring device may determine a likelihood that a current condition of each dependency of the plurality of dependencies will cause the first application to enter an unhealthy state. The healthy report may indicate that a second dependency, of the plurality of dependencies, is a most critical dependency based on the second dependency having a highest likelihood of causing the first application to enter an unhealthy state.

In some implementations, the monitoring device may determine, using the machine learning model, a second dependency of the plurality of dependencies that corresponds to a source of risk for the first application. The monitoring device may generate, using the machine learning model, a suggested action to mitigate a risk associated with the second dependency.

In some implementations the monitoring device may determine, using the machine learning model and based on the status records, at least one attribute of a second dependency of the plurality of dependencies that is correlated with performance of the first application. The monitoring device may generate, using the machine learning model, at least one recommended new monitoring interface to monitor the at least one attribute of the second dependency. And the monitoring device may configure the monitoring application to monitor the at least one recommended new monitoring interface.

According to some aspects, a computer-implemented method may be provided for determining that a service is a dependency of an application or other service. The method may be performed by any suitable computer, such as a monitoring device. The monitoring device may configure a monitoring application to monitor a first application and a plurality of first Application Programming Interfaces (APIs) used by the first application. The monitoring device may collect, by one or more data collecting agents and based on detecting that the first application has an unhealthy operating status, system state information corresponding to the first application and each of the plurality of dependencies. The monitoring device may store the collected system state information in a database as a first incident record corresponding to a first incident event and comprising incident attribute information for the first application and each of the plurality of first APIs The monitoring device may train a machine learning model based on a plurality of incident records including the first incident record. Training the machine learning model may include clustering incident events corresponding to each of the plurality of incident records for the first application. Clustering the incident events may be based on attributes of the system state information corresponding to each of the plurality of first API. The monitoring device may determine one or more patterns of performance based on the clustered incident event. A first pattern of performance of the one or more patterns of performance may indicate a potential correlation between a first attribute of the system state information corresponding to a second API, of the plurality of first APIs, and the first application having the unhealthy operating status. The monitoring device may complete initial training by updating the machine learning model based on the determined patterns of performance.

The monitoring device may determine, based on a determined first pattern of performance, that the second API is a dependency of the first application. The monitoring application may add the second API to a dependency map associated with the first application. The monitoring application may determine, using a first monitoring interface configured to provide one or more metrics regarding the second API, that the second API has an unhealthy operating status based on the one or more metrics satisfying one or more unhealthy operating status thresholds. The monitoring application may generate a notification, by the monitoring application, identifying a particular data resource provided by the second API and indicating that the unhealthy operating status of the second API is impacting performance of the first application.

API Call Interception and Testing

According to some aspects, a monitoring device may perform tests attempting to simulate unhealthy operating statuses in the application and dependencies. Results of this testing may be used to determine resiliency of the system to downstream unhealthy operating statuses. And this testing may be used to simulate unhealthy operating statuses in the system to generate real data that the intelligent services features may use to train the machine learning models. An interceptor may intercept calls from a monitored application to an API that the application depends on. The intercepted calls may be modified and passed on, in such a manner that they return failed and/or unexpected results to the application. The interceptor may modify a result returned to an API call, such as by causing a portion of calls to timeout or yield errors. The interceptor may monitor performance of the application based on the modified calls and determine whether the monitored application is able to recover from the simulated API problems. The intercepted calls may be cached prior to modification, allowing the interceptor to regenerate the unmodified calls and insert them into a queue for processing if that monitored application is not able to recover. According to some aspects, the interceptor and simulated API problems may be used to train the machine learning model. The interceptor may act as a chaos agent, operating within the system to simulate problems at the various API dependencies (and other dependencies) of the monitored application. This may allow for testing on live deployments with reduced impact to users.

Figure 17:
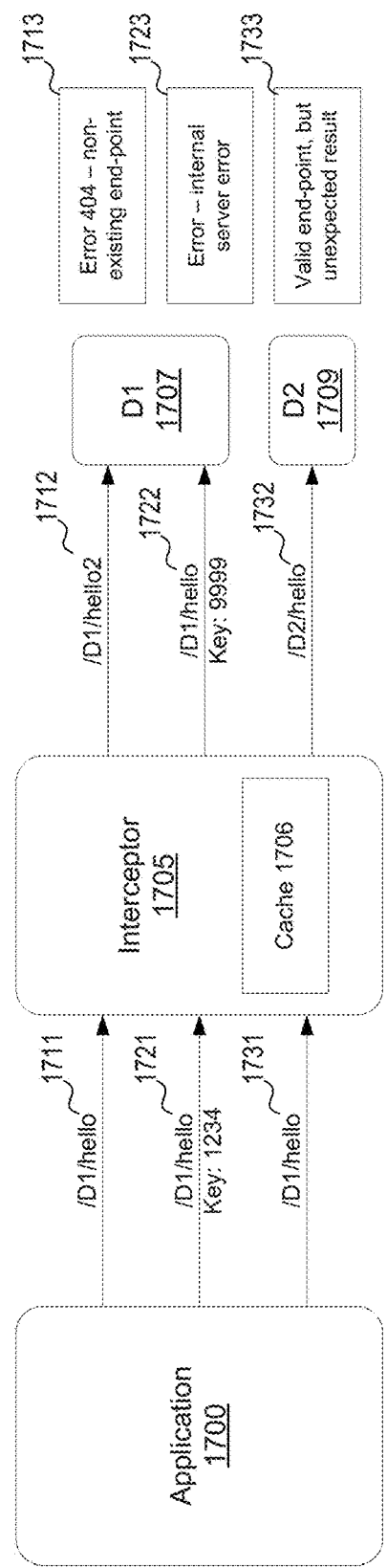
FIG. 17 depicts an example architecture for testing applications based on modifying API calls.

FIG. 17 depicts an example architecture for testing applications based on modifying API calls. The example architecture may include application 1700, interceptor 1705, and APIs D1 1707 and D2 1709. API calls originating from application 1700 and intended for API D1 may be intercepted by interceptor 1705 and modified to simulate an unhealthy operating status of API D1. The modified API calls may be sent on for further processing by the system, and may cause the API call to return a failed result. Additionally, and/or alternatively, interceptor 1705 may intercept the API calls and return modified results simulating an unhealthy operating status of the intended API. A monitoring application may monitor the impact of the failed results on application 1700 as part of a test of the resiliency of application 1700 to the unhealthy operating status of the intended API.

Application 1700 may correspond to a monitored application in an enterprise system, as discussed previously and throughout this disclosure. For example, application 1700 may correspond to application 201 and/or application 701 of FIGS. 2 and 7. A monitoring application may be configured to monitor operation of application 1700 through one or more monitoring interfaces that allow the monitoring application to retrieve one or more operating metrics associated with application 1700. Application 1700 may rely on one or more downstream dependencies to perform normal processing. In the architecture illustrated in FIG. 17, application 1700 may rely on API D1 1707 as a dependency. For example, API D1 may provide customer account information that application 1700 may use to verify a transaction.

Application 1700 may issue an API call identifying API D1 and requesting that API D1 perform some action, return some data, or provide another service. Three API calls 1711, 1721, and 1731 are illustrated in FIG. 17. Each may call a "hello" element of API D1. API call 1721 illustrates that an API call may comprise a key value needed by "hello", such as "1234". For example, application 1700 may issue an API call requesting that API D1 return account information, and the key value may be a userID used to identify the account. Each API call may be made via system processes, and the system may route the call to the proper API.

Interceptor 1705 may, however, intercept API calls 1711, 1721, and 1731. The system (e.g., through an operating system) may provide means by which interceptor 1705 may hook into the API D1, the application 1700, and/or other API processing systems. Interceptor 1705 may be configured to hook into calls to API D1 and modify the calls before they are passed on to API D1. Interceptor 1705 may modify one or more aspects of the API calls in a manner that may cause the API calls to fail. This may simulate an unhealthy operating status at API D1, for example. Interceptor 1705 may be configured to only intercept calls originating from application 1700, and calls originating from other applications intended for API D1 may be unaffected. And interceptor 1705 may be configured to only intercept a subset of calls from application 1700 to API D1, such as during a requested test period and/or at random intervals (as two examples).

As a first example illustrated in FIG. 17, API call 1711 may be intercepted and modified. API call 1711 may be modified from its original "/D1/hello" to "/D1/hello2". "hello2" may be a non-existing element, and a call to "/D1/hello2" may return a failed result. Interceptor 1705 may provide modified call 1712 to the system for processing in lieu of the original API call 1711. Modified call 1712 may be sent to API D1, which may return an error 1713 indicating that "hello2" is a non-existent end-point.

As a second example illustrated in FIG. 17, API call 1721 may be modified from its original "/D1/hello; key:1234" to "/D1/hello; key:9999". Modified call 1722 may be provided to the system for processing, and may be sent to API D1. API D1 may return an internal server error 1723 based on the improper key value in the modified call 1722.

As a third example illustrated in FIG. 17, API call 1731 may be modified from its original "/D1/hello" to "/D2/hello". This modification may cause the API call to be redirected to a different API D2 1709. Interceptor 1705 may cause the operating system to process modified call 1732 in lieu of original call 1731. The operating system may route modified call 1732 to API D2, which might still return a result 1733. But the unexpected result from API D2 may impact performance of application 1700.

As another example, not illustrated, interceptor 1705 may return simulated bad results to the API calls instead of and/or in addition to modifying and passing on the calls. Other aspects of an unhealthy operating status of API D1 may be simulated through interceptor 1705, such as introducing additional response latency, artificially increasing an error rate of API D1, returning unexpected or erroneous results, and any other suitable aspect to simulate API D1 having an unhealthy operating status.

A monitoring application associated with interceptor 1705 may observe the impact of the modified API calls and failed results on the operating status of application 1700. One or more monitoring interfaces associated with application 1700 may be used to determine whether application 1700 is able to recover from the simulated unhealthy operating status of API D1. Application 1700 may be designed to be resilient to an unhealthy operating status at its downstream dependency API D1. For example, application 1700 may be configured to detect a timeout of a request to API D1 and resubmit the request at expiration of the timeout. As another example, application 1700 may be configured to request a data resource provided by API D1 from another service capable of providing the data resource when API D1 is unable to provide the data resource. As still another example, application 1700 may be configured to gracefully handle the bad result by continuing to process a transaction to the best extent possible given the absence of the data resource provided by API D1. For example, application 1700 could still generate a transaction report and might just leave off a customer address and/or flag that item as requiring attention.

If the monitoring application determines that application 1700 was able to recover from the simulated unhealthy status of API D1, application 1700 may be deemed to have passed the test. If instead the application 1700 is not able to recover in a satisfactory manner, application 1700 may have failed the test and an administrator and/or machine learning process may be notified. The administrator and/or machine learning process may determine corrective action to take to increase application 1700's resiliency to an unhealthy operating status at API D1.

If application 1700 was not able to recover from the modified API call and/or failed result, then a transaction handled by application 1700 may fail. If the system and application tested are live for use by users, then the testing performed by interceptor 1705 may impact live users. Simply having the transaction fail due to an artificially simulated unhealthy system operating status may be unacceptable due to significant impact to users. Thus, interceptor 1705 may have a cache 1706 and may store unmodified API calls 1711, 1721, and 1731 in the cache. If application 1700 is not able to record from the corresponding modified API call, then interceptor 1705 may regenerate unmodified API call 1711, 1721, and/or 1731 and provide them to the system for processing. Thus, despite the initial simulated failure of the call, API D1 may later return a correct result expected by application 1705 and may properly process the user's transaction. This may introduce minor user impact associated with allowing time for the modified API call to impact application 1700, but may be so small that users do not notice. For example, the simulated unhealthy status and subsequent recovery of the original API call may introduce only a few milliseconds of additional response latency. In some embodiments, interceptor 1705 may regenerate and reintroduce unmodified API calls regardless of whether application 1700 is able to gracefully recover from the simulated unhealthy operating status.

Aspects described herein regarding API call interception and testing may allow for testing system brokenness on a live deployment. These techniques may create a randomized "safe" chaos testing with guardrails controllable by intelligent services features discussed above, and the system's resiliency may be tested against actual data, even if due to a simulated outage. Chaos testing using the API call interception techniques described above may be guided and/or targeted based on the patterns of failure (or other patterns of performance) determined by the intelligent services features. One advantage of the API call interception techniques may be that calls from other applications to the same API may remain unaffected while performing tests specific to application 1700. Another advantage is that chaos testing associated with data resource unavailability may be performed without actually taking the data resource down. This may allow for a quick recovery when testing ends or if significant user impact is detected, rather than requiring that a resource subject to chaos testing be brought back online. Instead of bringing the dependency down, the API call interception techniques described herein may intercept and mutate calls to the dependency to simulate an unhealthy operating status. This may result in failed requests without actually impacting the called API. Techniques described herein may ruin the call, rather than break the API itself. This may allow administrators to test a system without destroying it.

Figure 18:
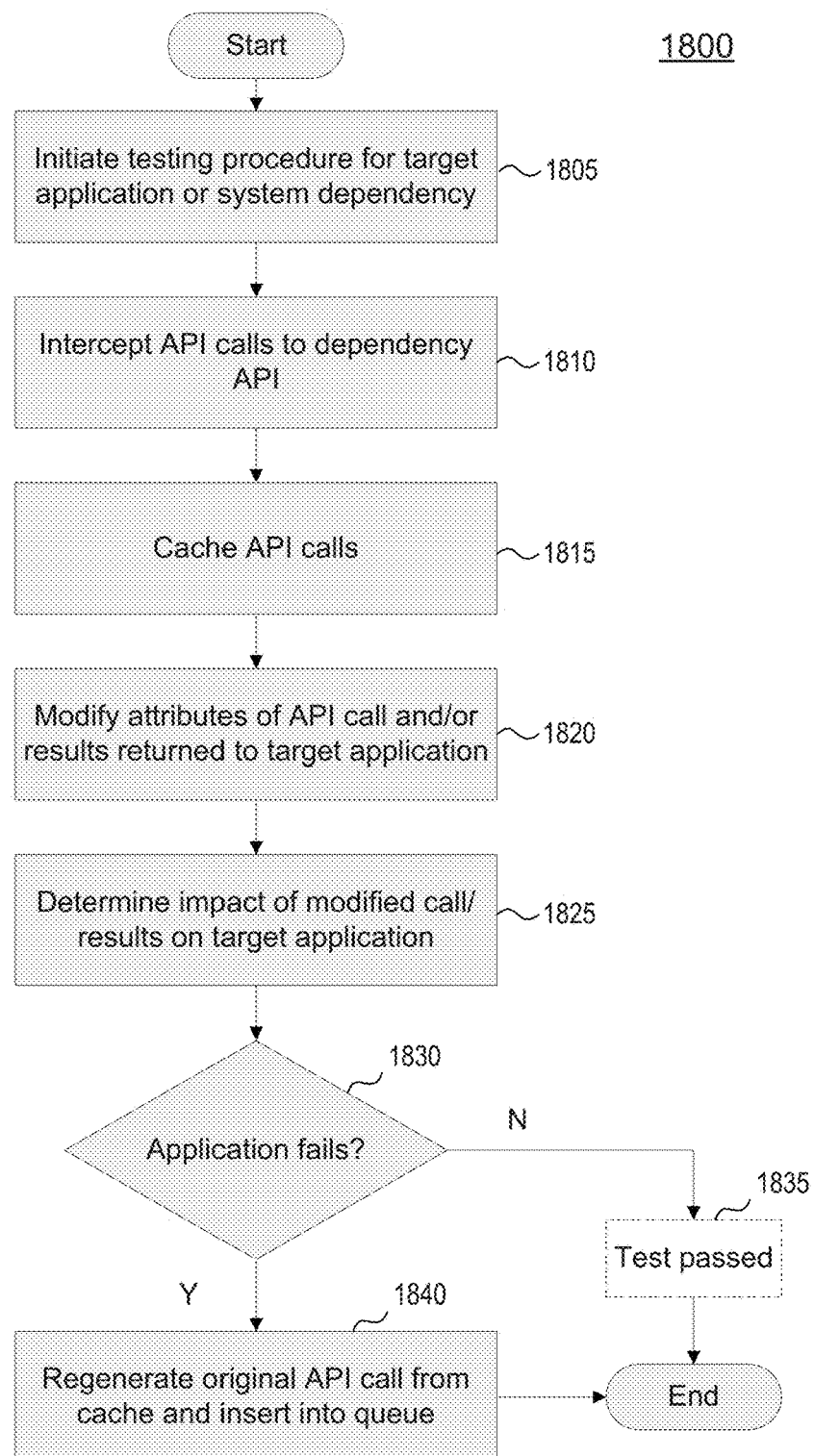
FIGS. 18 and 19 depict flowcharts illustrating example methods for testing applications based on modifying API calls.

FIG. 18 depicts a flowchart illustrating an example method 1800 for testing the impact of an unhealthy operating status of a dependency on a monitored application. Method 1800 may be performed on any suitable computing device, in similar fashion to that discussed above for method 500 of FIG. 5. For example, method 1800 may be performed on a monitoring device implementing interceptor 1705 of FIG. 17.

At step 1805, the monitoring device may initiate a testing procedure for a target application and/or dependency. The target application may be any type of service, such as a software application or API. The testing procedure may be configured to evaluate the impact of a simulated unhealthy operating status of downstream dependency on the target application and/or dependency. Initiating the testing procedure may be done based on a request from a user and/or machine learning process to perform the test. Initiating the testing procedure may also be done based on a scheduled test plan and/or on a random basis. The monitoring device may configure a scope and nature of the test, such as through determining one or more dependencies for which an unhealthy operating status should be simulated and the particular problem that may be causing the unhealthy operating status. For example, a test may be initiated that simulates the impact of increased response latencies over 100 ms at a given dependency.

At step 1810, the monitoring device may intercept an API call from the monitored application and/or dependency to the dependencies subject to the simulated unhealthy operating status. The monitoring device, implementing an interceptor application, may be configured to only intercept a subset of calls to the impacted dependencies. For example, the interceptor may be configured to only intercept calls originating from the monitored application and to ignore calls from other applications. The intercepted API calls may be actual API calls generated by the monitored application during live deployment and operation of the application, according to some aspects.

At step 1815, the monitoring device may cache the intercepted API calls in an unmodified state. The unmodified API calls may be cached to enable the system to regenerate the original API calls if the monitored application is not able to recover from the simulated unhealthy operating status of the API, as discussed above.

At step 1820, the monitoring device may modify attributes of the API call and/or results returned to the target application. Various potential modifications and mutations were discussed above, and may be used in implementing step 1820. The modified call may be provided to the system for further processing. The modifications may cause the API call to return a failed result to the application.

At step 1825, the monitoring device may determine an impact of the failed results on the monitored application. As discussed throughout this disclosure, a monitoring application may use one or more monitoring interfaces to observe operating metrics of the monitored application. These operating metrics may be used to determine whether and how the operating status of the monitored application is impacted by the simulated unhealthy operating status of the API.

At step 1830, the monitoring device may evaluate whether the monitored application was able to recover from the simulated unhealthy operating status of the API and the failed API call results. If the monitored application was able to recover, such as through retrieving necessary data from an alternative data source, then the application may be considered to have passed the test at step 1835.

At step 1840, if the application is determined to have failed to recover from the simulated unhealthy operating status of the API and failed API call results, the system may regenerate the original API call from the cache and insert it into the system's API call queue. The system may process the unmodified API calls in the typical fashion and may return expected results to the monitored application which may complete processing an associated transaction. As a result, end users may see nothing more than a brief latency spike as a result of the simulated unhealthy operating status of the dependency.

Figure 19:
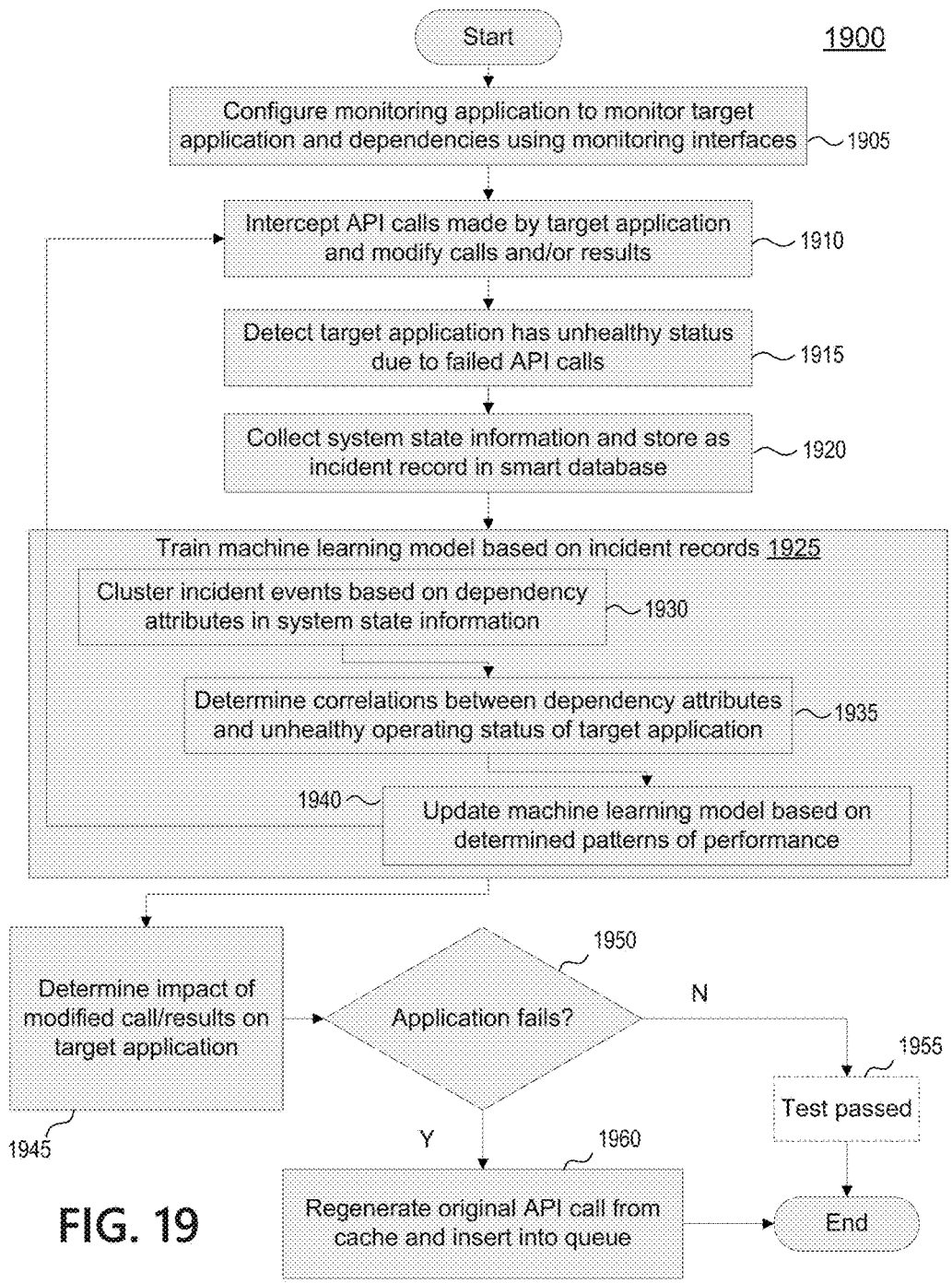

FIG. 19 depicts a flowchart illustrating an example method 1900 for using the API interception techniques discussed above to train a machine learning model, such as that used in the intelligent services features discussed above with respect to FIGS. 12-16. Like method 1800, method 1900 may be implemented on a suitable computing device such as a monitoring device. Although described briefly here, method 1900 may incorporate each of the features discussed above with respect to FIGS. 13 and 18.

At step 1905, a monitoring device may configure a monitoring application monitor a target application and its dependencies using one or more monitoring interfaces. Step 1905 may correspond to step 1305 of FIG. 13 and/or step 515 of FIG. 5, among other similar steps described herein.

At step 1910, the monitoring device may intercept API calls made by the target application and may modify the API calls and/or results to those API calls as discussed above. Step 1910 may correspond to steps 1810, 1815, and 1820 of FIG. 18.

At step 1915, the monitoring device may detect that the target application has an unhealthy status due to the failed results of the API calls. One or more monitoring interfaces configured to retrieve operational metrics associated with the monitored target application may be used to determine that the target application has an unhealthy operating status. Step 1915 may correspond to step 1305 of FIG. 13.

The monitoring device may then use actual data corresponding to the simulated performance incident to train the machine learning model in steps 1920, 1925, 1930, 1935, and 1940. These steps may correspond to similar steps in FIG. 13, including steps 1320, 1325, 1335, 1340, and 1345. The trained machine learning model may be used to generate recommendations regarding operation of the target application, as described with respect to FIG. 13.

At step 1945, the monitoring device may determine an impact of the modified API call or results on the target application to assess whether user impact resulted. At step 1950 the monitoring device may determine whether the application was able to recover from the simulated unhealthy operating status of the dependency. If the API was able to recover, there may be no user impact and the target application may be considered to pass the test at step 1955. If the API was unable to recover, and/or as a default response, the monitoring device at step 1960 may regenerate the original, unmodified API calls from the cache and insert them into an API call processing queue for further handling. The unmodified API calls may cause the API dependencies to return expected results to the target application, which may then properly process a transaction.

Combining the API call interception techniques with the intelligent services pattern of performance modelling may allow the machine learning model to train on real world data while having minimal impact on users in a live environment. Feeding the real data from simulated unhealthy events to the intelligent services may allow for improved training of and predictions by the event clustering techniques described above. Detected patterns of failure, due to the nature of machine learning techniques, may be imperfect and may benefit from continued refinement based on additional data. Using the API interception test techniques described herein may allow the machine learning model to fill in gaps in the data set and confirm detected patterns of failure (or other patterns of performance). The API interception test techniques described herein may be embodied in a testing agent configured to perform chaos testing throughout the system. This "chaos agent" may operate on a test plan and/or otherwise select target applications and dependencies. The chaos agent may use the techniques described above to simulate unhealthy operating statuses at different components of the system, and may evaluate an impact on other services in the system. This information may be fed into the intelligent services model to continue to learn how to predict what conditions may lead to the system having an unhealthy operating status as well as how the system may recover.

Thus, some aspects may provide a computer-implemented method for modifying API calls by a monitored application. The method may be implemented by any suitable computing device, such as a monitoring device. The monitoring device may receive a user command indicating a start of a testing period. The monitoring device may intercept, by a testing agent, a first call in a computing system from a first application to a first API during the testing period. Intercepting the first call to the first API may be based on determining that the first API is a dependency of the first application. The monitoring device may modify, by the testing agent, the first call by mutating at least one attribute of the first call. The mutation to the at least one attribute may cause the first call to fail. For example, the mutated call may return a bad result not suitable for use by the first application. Other calls to the first API are unaffected by the mutation to the at least one attribute of the first call. The monitoring device may cause the computing system to process the modified first call and return a result to the first application based on the mutation to the at least one attribute. The monitoring device may determine an impact of the modified first call on the operating status of the first application. Determining the impact of the modified first call may comprise determining, by a monitoring application, the operating status of the first application using one or more monitoring interfaces; and determining that the first application has an unhealthy operating status based on at least one metric provided by a first monitoring interface associated with the first application satisfying at least one unhealthy operating status threshold.

The monitoring device may cache, by the testing agent, the unmodified first call. The monitoring device may determine, by a monitoring application, whether the first application was able to recover from the modified first call returning a failed result. The first application may be determined to have been able to recover when the monitoring application determines that the first application was able to retrieve information associated with the first API from another source. Additionally, and/or alternatively, the first application may be determined to have been able to recover when the monitoring application determines that the first application was able to partially complete processing despite not receiving the information requested from the first API. Based on determining that the first application was not able to recover, the monitoring device may cause the computing system to process the cached unmodified first call and return a result to the first application based on the at least one attribute.

In some implementations, the mutation to the at least one attribute may comprise a change to any one of a function name associated with the first API; a change to a parameter included in the first call; a change to a destination, container, or scope associated with the first API; any other suitable mutations that cause the first call to fail; or any combination thereof.

According to some aspects, another computer-implemented method for modifying results of API calls may be provided. A monitoring device may receive a user command indicating a start of a testing period. The monitoring device may intercept, by a testing agent, a first call in a computing system from a first application to a first API during the testing period. A second call to the first API may be unaffected by modifying the result of the first call. The monitoring device may cause the computing system to process the intercepted first call and return a modified result to the first application. The modified result may simulate an unhealthy operating status of the first API. The monitoring device may determine an impact of the modified result to the first call on the operating status of the first application.

In some implementations, the modified result may simulate an unhealthy operating status of the first API by simulating one or more of the following: a result with an artificially high response latency; a result with an artificially high error rate; a result with an artificially high likelihood of non-response; any other suitable simulated failure; or any combination thereof.

As described with respect to modifying the API calls above, implementations related to simulating results may cache the unmodified API calls and insert them into system queues for processing if the monitored application is unable to recover from the simulated unhealthy operating status.

According to some aspects, a computer-implemented method may be provided for training a machine learning model, such as in the intelligent services features discussed above with respect to FIGS. 12-16. A monitoring device may configure a monitoring application to monitor a first application and a plurality of dependencies of the first application using a plurality of monitoring interfaces. The monitoring device may collect, by one or more data collecting agents and at a first time, first system state information corresponding to the first application and each of the plurality of dependencies, wherein the first application has a healthy status at the first time. The monitoring device may receive a user command indicating a start of a testing period. The monitoring device may intercept, by a testing agent, a first call in a computing system from a first application to a first API during the testing period and at a second time. The monitoring device may modify, by the testing agent, the first call by mutating at least one attribute of the first call, wherein the mutation to the at least one attribute causes the first call to fail. The monitoring device may cause the computing system to process the modified first call and return a result to the first application based on the mutation to the at least one attribute. Additionally, and/or alternatively, the monitoring device may cause the system to return a modified result simulating an unhealthy operating status of the first API.

The monitoring device may detect, by the monitoring application and based on the plurality of monitoring interfaces, that the first application has an unhealthy operating status as a result of the modified first call. The monitoring device may collect, by the one or more data collecting agents and based on detecting that the first application has the unhealthy operating status, second system state information corresponding to the first application and each of the plurality of dependencies. The monitoring device may store the collected first system state information and second system state information in a database as a first status record and a second status record, respectively. The monitoring device may train a machine learning model based on a plurality of status records including the first status record and the second status record. Training the machine learning model may comprise: clustering incident events corresponding to status records associated with the first application having an unhealthy status, wherein clustering the incident events is based on attributes of system state information, of a corresponding status record, corresponding to each of the plurality of dependencies; determining one or more patterns of performance based on the clustered incident events and the first system state information, wherein a first pattern of performance of the one or more patterns of performance indicates a potential correlation between a first attribute of the system state information corresponding to the first API and the first application having the unhealthy operating status; and updating the machine learning model based on the determined patterns of performance.

The monitoring device may generate, using the machine learning model and based on the first pattern of performance, a health report for the first application and the plurality of dependencies. The health report may indicate a likelihood that the first application will enter an unhealthy status.

Methods of using API call interception to test and train a machine learning model may combine aspects described herein regarding intelligent services and API call interception and modification. Implementations may have features similar to those described above with respect to the intelligent services and API call interception features.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   determining a plurality of services associated with a first application and organized as a dependency tree, wherein the plurality of services comprises:
   one or more first services corresponding to one or more immediate dependencies of the first application; and
   one or more second services corresponding to one or more sub-dependencies of the first application, wherein each of the second services corresponds to a respective dependency of a corresponding immediate dependency or sub-dependency of the first application;
   configuring a monitoring application to monitor the plurality of services using a plurality of monitoring interfaces;
   automatically identifying, by the monitoring application, a problem service of the plurality of services through a tree traversal process, wherein the tree traversal process begins at a first layer, as a current layer, of the dependency tree that corresponds to the one or more immediate dependencies of the first application and comprises:
   determining, based on the plurality of monitoring interfaces, an operating status of each service included in the current layer of the dependency tree; and
   based on whether a first service of the current layer is identified as having an unhealthy status, and based on whether each service of the current layer is identified as having a healthy status:
   when the first service is identified as having an unhealthy status, continuing to traverse the dependency tree to identify the problem service by advancing to a next layer of the dependency tree as the current layer, wherein the next layer of the dependency tree comprises services corresponding to one or more dependencies of the first service; and
   when each service of the current layer is identified as having a healthy status, identifying a parent service, of an immediately prior layer of the dependency tree, that has an unhealthy status as the problem service; and
   generating, by the monitoring application, a notification indicating that the parent service is the problem service,
   wherein determining the operating status of a given service comprises determining, using a corresponding monitoring interface, one or more of:
   whether a resource associated with the corresponding dependency is accessible;
   a response latency associated with requests to the corresponding dependency;
   an error rate associated with requests to the corresponding dependency; or
   an error state or error message provided by the corresponding dependency.

2. The method of claim 1, wherein at least one service of the plurality of services corresponds to an Application Programming Interface (API) associated with a resource utilized by the first application.

3. The method of claim 1, wherein at least one service of the plurality of services corresponds to a network utilized by the first application to communicate with another dependency.

4. The method of claim 1, wherein the first application comprises an Application Programming Interface (API).

5. The method of claim 1, wherein a given service is determined to have an unhealthy status based on whether one or more metrics associated with the corresponding dependency satisfy one or more operating status thresholds.

6. The method of claim 5, wherein configuring the monitoring application to monitor the plurality of services comprises:
configuring the monitoring application to associate the one or more operating status thresholds with the corresponding dependencies.

7. The method of claim 1, wherein determining the operating status of a given service is based on a predetermined time period prior to a current time.

8. The method of claim 1, wherein the plurality of monitoring interfaces comprises a first monitoring interface configured to enable monitoring of a second service utilized by the first application,
wherein the first monitoring interface is generated by a first monitoring interface application and is configured to determine at least one metric associated with the second service.

9. The method of claim 8, wherein configuring the monitoring application to monitor the plurality of services using the plurality of monitoring interfaces comprises:
configuring the monitoring application to utilize the first monitoring interface through at least one monitoring query associated with the first monitoring interface application.

10. The method of claim 8, wherein the plurality of monitoring interfaces comprises a second monitoring interface configured to enable monitoring of a third service utilized by the first application,
wherein the second monitoring interface is generated by a second monitoring interface application and is configured to determine at least one metric associated with the third service,
wherein the second monitoring interface application is different from the first monitoring interface application and utilizes a different query protocol.

11. The method of claim 1 wherein determining the operating status of each service included in the current layer of the dependency tree comprises:
determining whether the operating status of a given service, of the services in the current layer, has previously been determined by the monitoring application during the tree traversal process; and
based on determining that that operating status has already been determined, using the previously determined operating status for the given service.

12. The method of claim 1, further comprising:
generating, by the monitoring application, a health report for the first application by traversing the dependency tree to determine an operating status of each service of the plurality of services,
wherein the monitoring application is configured to periodically generate the health report for the first application.

13. The method of claim 12, wherein determining, as part of the tree traversal process, the operating status of each service included in a current layer of the dependency tree is based on operating statuses determined during generating the health report.

14. An apparatus comprising:
one or more processors; and
memory storing instructions that, when executed, cause the apparatus to:
determine a plurality of services associated with a first application, wherein the plurality of services comprises:
one or more first level services corresponding to one or more first level dependencies of the first application;
one or more second level services corresponding to one or more second level dependencies of the first application, wherein each second level dependency is a dependency of a corresponding first level dependency; and
one or more third level services corresponding to one or more third level dependencies of the first application, wherein each third level dependency is a dependency of a corresponding second level dependency;
configure a monitoring application to monitor the plurality of services using a plurality of monitoring interfaces;
generate, based on the plurality of monitoring interfaces, a health report for the first application, wherein the instructions cause the apparatus to generate the health report by causing the apparatus to:
determine an operating status of the first application;
determine, based on the plurality of monitoring interfaces, an operating status of each of the first level dependencies;
identify a first service of the first level services as having an unhealthy operating status;
determine, based on the plurality of monitoring interfaces, an operating status of each of the second level dependencies that are dependencies of a first level dependency corresponding to the first service;
identify a second service, of the second level services that correspond to dependencies of the first level dependency, as having an unhealthy operating status;
determine, based on the plurality of monitoring interfaces, an operating status of each of the third level dependencies that are dependencies of a second level dependency corresponding to the second service;
determine that each third level service has a healthy operating status; and
identify the second service having the unhealthy operating status as a problem service based on determining that each third level service has a healthy operating status; and
generate a notification indicating that the second service is a problem service based on the health report,
wherein determining the operating status of a given service comprises determining, using a corresponding monitoring interface, one or more of:
whether a resource associated with the corresponding dependency is accessible;
a response latency associated with requests to the corresponding dependency;
an error rate associated with requests to the corresponding dependency;
or
an error state or error message provided by the corresponding dependency.

15. The apparatus of claim 14, wherein the first level dependencies correspond to immediate dependencies of the first application.

16. The apparatus of claim 14, wherein the first level dependencies correspond to sub-dependencies associated with the first application,
wherein each sub-dependency of the first level dependencies is a dependency of a respective dependency of a prior level associated with the first application.

17. The apparatus of claim 16, wherein the instructions cause the apparatus to generate the health report by further causing the apparatus to:
determine an operating status of a prior level dependency of the prior level; and identify the prior level dependency as having an unhealthy operating status,
wherein each first dependency of the first level dependencies is a dependency of the prior level dependency identified as having an unhealthy operating status.

18. One or more non-transitory computer readable media storing instructions that, when executed by one or more processors, cause a computing device to perform steps comprising:
    determining a plurality of dependency nodes associated with a first application and organized as a dependency tree, wherein the plurality of dependency nodes comprises:
        one or more first nodes corresponding to one or more immediate dependencies of the first application; and
        one or more second nodes corresponding to one or more sub-dependencies of the first application, wherein each of the second nodes corresponds to a respective dependency of a corresponding immediate dependency or sub-dependency associated with the first application,
        wherein at least one dependency node of the plurality of dependency nodes corresponds to an Application Programming Interface (API) associated with a resource utilized by the first application;
    identifying a plurality of monitoring interfaces associated with a monitoring interface application and configured to enable monitoring of a plurality of resources utilized by the first application, wherein each monitoring interface of the plurality of monitoring interfaces is configured to determine at least one metric associated with a respective resource of the plurality of resources;
    configuring the monitoring application to utilize the plurality of monitoring interfaces to monitor the plurality of dependency nodes through at least one monitoring query associated with the monitoring interface application;
    automatically identifying, by the monitoring application, a problem node of the plurality of dependency nodes through a tree traversal process, wherein the tree traversal process begins at a first layer, as a current layer, of the dependency tree that corresponds to the one or more immediate dependencies and comprises:
        determining, based on the plurality of monitoring interfaces, an operating status of each dependency node included in the current layer of the dependency tree; and
        based on whether a given dependency node of the current layer is identified as having an unhealthy status, and based on whether each dependency node of the current layer is identified as having a healthy status:
            when the given dependency node is identified as having an unhealthy status, continuing to traverse the dependency tree to identify the problem node by advancing to a next layer of the dependency tree as the current layer, wherein the next layer of the dependency tree comprises nodes corresponding to a one or more sub-dependencies of the dependency corresponding to the given dependency node; and
            when each dependency node of the current layer is identified as having a healthy status, identifying a parent dependency node, of an immediately prior layer of the dependency tree, that has an unhealthy status as the problem node; and
    generating, by the monitoring application, a notification indicating that the parent dependency node is the problem node
    wherein determining the operating status of a given dependency node comprises determining, using a corresponding monitoring interface, one or more of:
        whether a resource associated with the corresponding dependency is accessible;
        a response latency associated with requests to the corresponding dependency;
        an error rate associated with requests to the corresponding dependency; or
        an error state or error message provided by the corresponding dependency.

19. The computer readable media of claim 18, wherein the given dependency node is determined to have an unhealthy status based on whether one or more metrics associated with the corresponding dependency satisfy one or more operating status thresholds, wherein configuring the monitoring application to monitor the plurality of dependency nodes further comprises:
    configuring the monitoring application to associate the one or more operating status thresholds with the corresponding dependencies.

* * * * *